(12) United States Patent
Kilambi et al.

(10) Patent No.: US 8,500,902 B2
(45) Date of Patent: Aug. 6, 2013

(54) METHODS OF MAKING CEMENTITIOUS COMPOSITIONS AND PRODUCTS MADE THEREBY

(76) Inventors: Srinivas Kilambi, Marietta, GA (US); Krishnan Iyer, Kennesaw, GA (US); Karthik Gopalakrishnan, Denton, TX (US); Ramesh Chembeti, Acworth, GA (US); Niraj Singh, Kennesaw, GA (US); Satish Reddy Dhumpala, Atlanta, GA (US); Zijun Liu, Marietta, GA (US); Raman Kumar Gottumukkala, Marietta, GA (US); Subhadeep Mukherjee, Kennesaw, GA (US)

( * ) Notice: Subject to any disclaimer, the term of this patent is extended or adjusted under 35 U.S.C. 154(b) by 484 days.

(21) Appl. No.: 12/789,025

(22) Filed: May 27, 2010

(65) Prior Publication Data

US 2011/0059316 A1    Mar. 10, 2011

Related U.S. Application Data

(60) Provisional application No. 61/244,591, filed on Sep. 22, 2009, provisional application No. 61/239,991, filed on Sep. 4, 2009.

(51) Int. Cl.
*C04B 7/43* (2006.01)

(52) U.S. Cl.
USPC ........................................................ 106/739

(58) Field of Classification Search
USPC ........................................................ 106/739
See application file for complete search history.

(56) References Cited

U.S. PATENT DOCUMENTS

| | | | |
|---|---|---|---|
| 4,026,717 A | 5/1977 | Harris et al. | |
| 4,081,285 A | 3/1978 | Pennell | |
| 4,137,089 A * | 1/1979 | Arnould et al. | 106/739 |
| 4,342,598 A | 8/1982 | Kogan | |
| 4,404,032 A | 9/1983 | Nudelman et al. | |
| 4,913,742 A | 4/1990 | Kwech | |
| 5,122,189 A | 6/1992 | Garrett et al. | |
| 5,156,676 A | 10/1992 | Garrett et al. | |
| 5,188,668 A | 2/1993 | Litka et al. | |
| 5,571,319 A | 11/1996 | Berke et al. | |
| 5,632,616 A | 5/1997 | Tutt et al. | |
| 5,972,104 A | 10/1999 | Doumet | |
| 6,240,859 B1 | 6/2001 | Jones, Jr. | |

(Continued)

FOREIGN PATENT DOCUMENTS

| | | |
|---|---|---|
| WO | 9116274 | 10/1991 |
| WO | 9716390 | 5/1997 |

(Continued)

OTHER PUBLICATIONS

S C Halim et al.; Preparation of an ultra fast binding cement from calcium silicate-based mixed oxide nanoparticles. Nanotechnology 18 (2007) 395701 (6pp).

(Continued)

*Primary Examiner* — Paul Marcantoni

(57) ABSTRACT

A method of making cementitious particles using combustion synthesis is described. The method uses less energy and produces lower $CO_2$ emissions than conventional processes. By controlling the process conditions, the morphology and the properties of the particles can be easily tuned for a variety of applications. A batch reactor and a continuous conveyor type reactor that can be used for the combustion synthesis with high viscosity raw materials are also described.

72 Claims, 13 Drawing Sheets

U.S. PATENT DOCUMENTS

| | | | |
|---|---|---|---|
| 6,709,510 B1 | 3/2004 | Young et al. | |
| 6,805,554 B2 | 10/2004 | Ludger et al. | |
| 7,294,193 B2 * | 11/2007 | Comrie | 106/707 |
| 7,776,301 B2 * | 8/2010 | Comrie | 423/242.1 |
| 2001/0047623 A1 | 12/2001 | Milosavljevic et al. | |
| 2003/0106467 A1 | 6/2003 | Jones, Jr. | |
| 2004/0110107 A1 | 6/2004 | Brentrup et al. | |
| 2005/0274068 A1 | 12/2005 | Morton et al. | |
| 2005/0274293 A1 | 12/2005 | Morton et al. | |
| 2007/0184394 A1 | 8/2007 | Comrie | |
| 2009/0305180 A1 | 12/2009 | Altfeld et al. | |
| 2009/0311169 A1 | 12/2009 | Rajeshwar et al. | |

FOREIGN PATENT DOCUMENTS

| | | |
|---|---|---|
| WO | 2005123885 A1 | 12/2005 |
| WO | 2007092504 A2 | 8/2007 |
| WO | 2008059378 A2 | 5/2008 |
| WO | 2008106461 A1 | 9/2008 |

OTHER PUBLICATIONS

Raab B.; "Synthesis of pure cement phases by different synthesis methods." (1pp) Martin-Luther University Halle-Wittenberg Institute for Geological Science Mineralogy/Geochemistry.

Mimani T.; "Solution combustion synthesis of nanoscale oxides and their composites." Mater. Phys. Mech. 4 (2001) 134-137.

Wesselsky A.; "Synthesis of pure Portland cement phases." Cement and concrete research. 2009, vol., 39, n'11, pp. 973-980.

Zapata A; "Low temperature preparation of belitic cement clinker." Journal of the European Ceramic Society. vol. 29, Issue 10, Jul. 2009, pp. 1879-1885.

Kingsley J.J.; "Combustion synthesis of fine-particle metal alunninates." Journal of Materials Science 25 (1990) 1305-1312.

Fumo D.A.; "Combustion synthesis of calcium alunninates." Materials Research Bulletin, vol. 31, Issue 10, Oct. 1996, pp. 1243-1255.

* cited by examiner

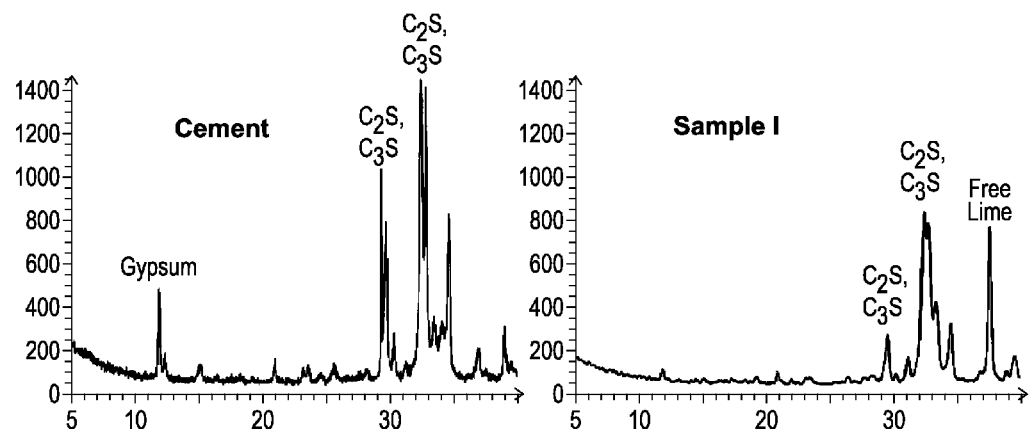
FIG. 8A
FIG. 8B
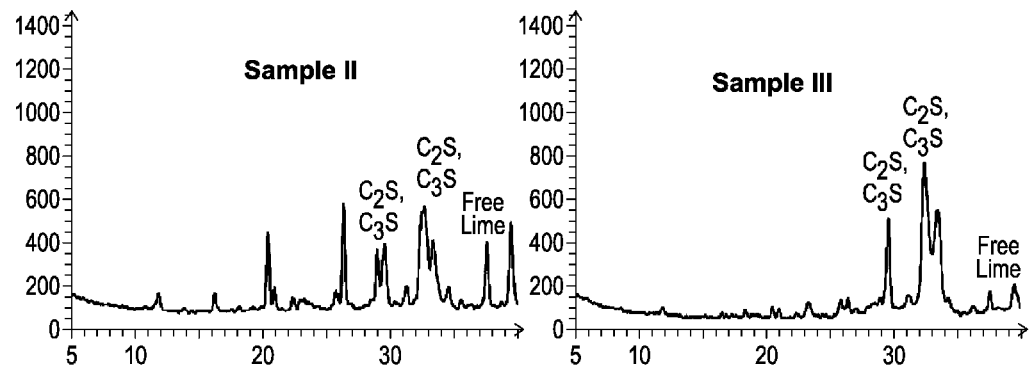
FIG. 8C
FIG. 8D
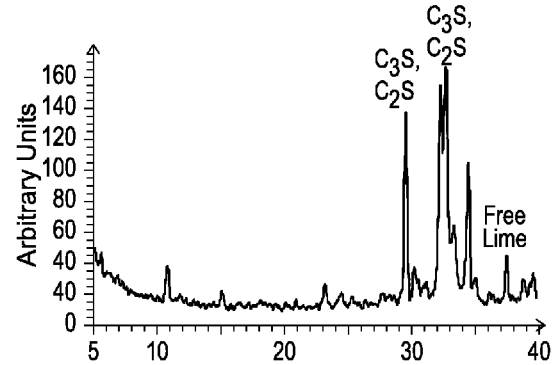
FIG. 9

US 8,500,902 B2

METHODS OF MAKING CEMENTITIOUS COMPOSITIONS AND PRODUCTS MADE THEREBY

This application claims the benefit of Provisional U.S. Patent Application Ser. No. 61/239,991, filed on Sep. 4, 2009, and Provisional U.S. Patent Application Ser. No. 61/244,591, filed on Sep. 22, 2009. Each of these applications is incorporated by reference herein in its entirety.

TECHNICAL FIELD

This invention relates generally to methods for making a cementitious composition and to products made thereby.

BACKGROUND OF THE TECHNOLOGY

Conventional cement is produced by superheating a mixture of limestone and other materials, such as clay, sand etc. at around 1450° C. The most commonly used cement is Portland cement, with a composition of tri-calcium silicate ($C_3S$ in cement chemist notation), di-calcium silicate ($C_2S$), tri-calcium aluminate ($C_3A$) and tetra-calcium aluminoferrite ($C_4AF$). The composition of Portland cement is shown in Table 1A.

TABLE 1A

| Composition of Portland Cement | | | |
|---|---|---|---|
| CaO | $SiO_2$ | $Al_2O_3$ | $Fe_2O_3$ |
| 62~67 wt % | 20~24 wt % | 4~7 wt % | 3~5 wt % |

White ordinary Portland cement (WOPC) is similar to Ordinary Portland cement (OPC) except for the color. WOPC is snow white in color and can be used to produce different colors of concrete when mixed with colored pigments. The uses of white cement are limited compared to OPC because its manufacturing cost is much more than that of OPC. Therefore, WOPC has not been widely used as a substitute for OPC.

The greenish-gray to brown color of ordinary Portland cement is derived from a number of transitional elements like chromium, manganese, iron, copper, vanadium, nickel and titanium. These elements find very little space in the composition of white cement. In particular, the amount of $Cr_2O_3$ is maintained below 0.003%, $Mn_2O_3$ is maintained below 0.03%, and $Fe_2O_3$ is maintained below 0.35% in the clinker. The other elements are usually not a significant problem. Portland cement is generally made from limestone, clay, shale, iron ore, bauxite and sand. This usually contains substantial amounts of Cr, Mn and Fe. Limestone used in cement manufacture contains 0.3-1% $Fe_2O_3$, whereas levels below 0.1% are sought in limestone for white cement manufacture.

Conventionally, WOPC is produced by superheating the raw mix to higher peak in temperature of (1450-1500° C.) than that of the OPC where the peak is (1400-1450° C.). The fuel consumption to produce WOPC is 20-50% more than that of OPC and also results in lower kiln output ranging from 20-50% less for a given sized kiln. The composition of white Portland cement is shown in Table 1B.

TABLE 1B

| Composition Of White Portland Cement | | | |
|---|---|---|---|
| CaO | $SiO_2$ | $Al_2O_3$ | $Fe_2O_3$ |
| 66.3 wt % | 22.5 wt % | 4.5 wt % | 0.3 wt % |

The hydration rate of cement after mixing with water depends on the surface area of the cement. The final product has to be ground to reduce the size of cement particles. Commercially available cements have particle sizes ranging from a few microns to 60 microns with a surface area from 0.3 to 1.2 $m^2/g$. It usually takes 7-14 days for the setting of micronsized cement particles. Nano size cement particles will react with water in a very fast rate, which will offer applications in building renovations, sealing and as an accelerating additive to presently used cements.

Conventional cement manufacturing is very energy intensive, consuming about 3 to 6 GJ of energy per ton of ordinary cement produced. The manufacture of white cement consumes about 5 to 8 GJ of energy per ton of white cement produced. In the year 2007, 2600 million tons of cement was produced worldwide, which accounts for 8.3 percent of global industrial energy use. The chemical reactions involved in heating limestone and the burning of the fuel gives off $CO_2$, which contributes to 8% of global $CO_2$ emissions. It remains a challenge to reduce the energy cost, as well as the $CO_2$ emissions from the cement manufacturing process for a sustainable point of view. Many modifications have been done to reduce the energy usage and $CO_2$ emissions, but these modifications did not significantly contribute to the cause.

Combustion synthesis (CS), originally called self-propagating high-temperature synthesis (SHS), is the synthesis of materials or compounds using self-sustaining highly exothermic redox chemical reactions (combustion). It has been widely applied for the synthesis of metal oxides. Cement prepared by combustion synthesis has the following advantages over conventional manufacturing processes:

the cement particles prepared by CS are in nano sized range, with very fast hydration rate compared with conventional Portland cement;

the equipment used in CS is relatively simple which lowers the capital cost;

the CS process has low energy requirements. The energy released from the exothermic reaction, which is usually ignited at a relative low temperature, can rapidly heat the raw materials to a high temperature and sustain long enough for the synthesis to complete. Therefore, no constant external heat supply is necessary. The process can reduce the energy cost by 40-50% and lower the $CO_2$ emissions by at least 20%; and the CS process can be completed in seconds due to the fast reaction rate.

SUMMARY

According to a first embodiment, a method is provided which comprises:

introducing a raw material mixture and a fuel into an inlet of a reactor chamber, wherein the raw material mixture comprises: calcium nitrate; an aluminum source; a silica source; and optionally, an iron source;

transporting the raw material mixture and fuel through the reactor chamber from the inlet towards an outlet of the reactor chamber while heating to the self ignition temperature of the fuel and allowing combustion of the fuel to heat up the raw material mixture to a temperature of 900-1500° C. thereby allowing the raw material mixture to react to form cementitious particles which are ejected from the outlet of the reactor chamber;

cooling the cementitious particles emerging from the outlet of the reactor chamber; and According to a second embodiment, a method is provided which comprises:

evaporating water from a raw material mixture at a temperature of 20° C. to 100° C., wherein the raw material mixture comprises: calcium nitrate; an aluminum source; a silica source; and optionally, an iron source;

subsequently heating the raw material mixture to the self ignition temperature of the fuel;

allowing combustion of the fuel to heat up the raw material mixture to a temperature of 900-1500° C. thereby allowing the raw material mixture to react to form cementitious particles; and cooling the cementitious particles.

According to a third embodiment, a method is provided which comprises:

heating a raw material mixture to a temperature of 60° C. to 135° C. such that the mixture becomes a liquid, wherein the raw material mixture comprises: calcium nitrate; an aluminum source; a silica source; and optionally, an iron source.

Cement particles produced by a method as set forth above are also provided.

BRIEF DESCRIPTION OF THE DRAWINGS

FIGS. 8a-8d are x-ray diffraction (XRD) plots of SGM samples I, II, III (FIGS. 8b, 8c and 8d, respectively) compared to a conventional cement (FIG. 8a).

FIG. 9 is an XRD plot of SGM cement sample IV.

DETAILED DESCRIPTION OF THE INVENTION

Figure 1A:
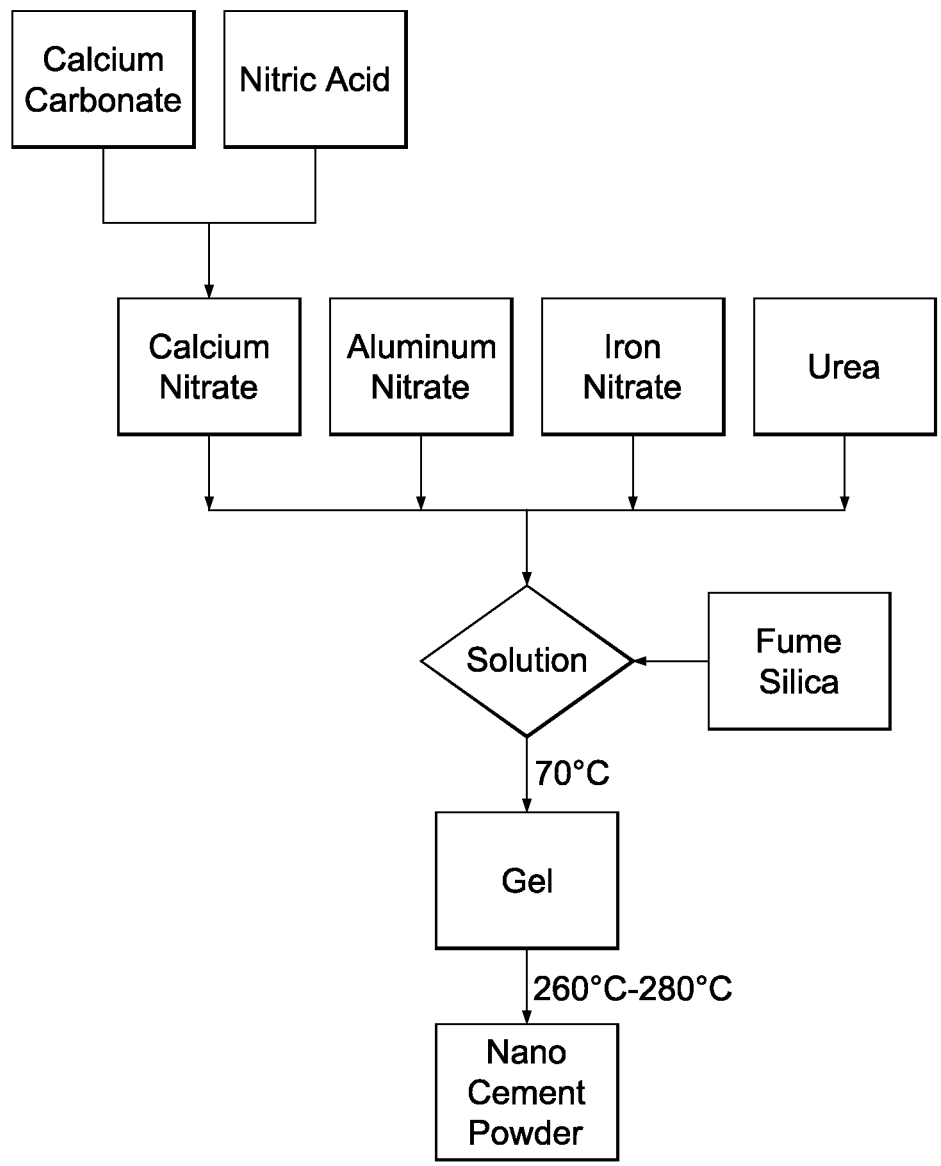
FIG. 1A is a flow chart of an experimental procedure for combustion synthesis of a cementitious composition which includes an iron source (i.e., iron nitrate).

Disclosed are various methods, apparatus configurations, and compositions for manufacturing a cementitious composition. The cementitious composition can be in the form of nanoscale particles. One method involves using calcium nitrate as a raw material, and mixing the calcium nitrate with at least one silica source, such as fumed silica, an aluminum sources, such as aluminum oxide or aluminum nitrates, an iron source, such as an iron oxide or iron nitrate, and a fuel. The mixture can be heated for a certain time to evaporate water. The resulting viscous gel is then heated to ignite the combustion reaction. The heat from the intensive exothermic reactions will sustain itself long enough to complete the synthesis. The resulting product contains the same components as conventional Portland cement, including tri-calcium silicate, di-calcium silicate, tri-calcium aluminate and tetra-calcium aluminoferrite.

Alternatively, the iron source can be left out of the raw material mixture to produce a white (i.e., brighter) cementitious composition. The resulting product contains the same components as conventional white Portland cement, including tri-calcium silicate, di-calcium silicate and tri-calcium aluminates.

In one instance, a method involves using the same raw materials as those used in conventional cement industries (e.g., limestone, clay, sand and iron ore). Calcium carbonate can be dissolved in and reacted with nitric acid to make calcium nitrate. Clay or other sources of silicon, aluminum, and iron (if the mixture comprises an iron source) can then be added and a fuel can be mixed with the raw materials.

In a conventional cement manufacturing process, the solid mixture has to be heated to 1450° C. (1500° C. for white cement) so that it can be partially melted and the solid liquid reaction can be faster than solid reaction. The whole process can take more than 30 minutes. In solution combustion, the raw materials are mixed uniformly, and in liquid phase. The reactions complete in seconds once ignited.

Urea can be used as a fuel. When urea is used as a fuel, its ignition temperature is about 260-280° C. After the urea is ignited, no external source of heat will be needed.

Unlike the conventional process, in which the produced cement clinker has an 80% passing size between 10 and 40 mm and has to be ground to reduce particles size to less than 60 microns, the combustion synthesis process is a nano technology, where the particles produced can be a few to a few tens of nanometers in size, and the particle size can be easily controlled by varying the sintering time.

In conventional cement manufacturing processes, iron is added to lower the melting point of the mixture, which also imparts a gray color to the cement. In combustion synthesis, the melting point of the mixture is less than 100° C. Therefore, the addition of iron can be avoided which will result in a brighter color for the cement.

In a conventional WOPC manufacturing process, the whole manufacturing setup must be altered to produce the white cement in the same kiln used for OPC manufacturing. This results in more fuel consumption and lower kiln output. By using a CS process as described herein, the fuel amount can be reduced by 50-60%.

Also disclosed is a batch reactor designed for combustion synthesis. The reactor includes a source of heating (e.g., an immersion heater, a heating belt or a burner) and a cooling air supply. The production rate of this batch reactor is about 1 kg of cement per batch. Also disclosed is a continuous system equipped with screw pump to feed the raw material, a heater to heat the raw material and ignite it, and a conveyer reactor for the transportation of viscous suspension-type material and products. The system is more fully described below.

According to some embodiments, nano-sized cementitious particles (e.g., Portland cement particles) are prepared by a solution combustion synthesis method comprising the following steps:

(1) reacting calcium carbonate with nitric acid to form calcium nitrate;

(2) dissolving an aluminum source, optionally an iron source and a fuel into the calcium nitrate to form an aqueous solution;

(3) adding a silica source into the solution with stirring;

(4) dehydrating the solution at a temperature up to 70° C. to remove water;

(5) subsequently, heating to a temperature of 260-280° C. to ignite the self propagating combustion and to form the cement particles (i.e., clinker); and (6) subsequently, cooling the clinker.

5-50 g lab scale experiments were conducted on a relatively simple experimental setup consisting of high temperature glass beaker, a heating plate with a magnetic stirrer and a furnace for the combustion reaction. A schematic block diagram of the experimental procedure for combustion synthesis of a raw material mixture comprising an iron source is shown in FIG. 1A.

As shown in FIG. 1A, calcium carbonate is first converted to calcium nitrate. This conversion reaction is performed since calcium nitrate has higher dissolvability in aqueous solutions and the nitrate will decompose and give off oxygen to support the combustion of the fuel. The thermal decomposition of calcium carbonate during the conventional cement manufacturing requires a tremendous amount of energy.

$$CaCO_3 + 2HNO_3 \rightarrow Ca(NO_3)_2 + H_2O + CO_2$$

As shown in FIG. 1A, sources of aluminum, silica and iron are added into the solution. In laboratory scale processes, the aluminum source can be aluminum oxide, aluminum nitrate or aluminum acetate. The silica source can be fumed silica or colloidal silica. The iron source can be iron oxide or iron nitrate. In larger scale processes, clay or other materials used in conventional cement manufacturing can be used.

After mixing the raw materials, water can be removed by evaporation at 70° C. If water is not removed, it will consume more energy during the combustion process. The temperature during evaporation should be controlled below 70° C., because nitric acid ions can decompose at temperatures of 72° C. or higher.

$$4H^+ + 4NO_3^- \rightarrow 2H_2O + 4NO_2 + O_2$$

After the evaporation of water, the solution becomes a viscous gel. When the gel is heated, the nitrates will decompose to give oxygen.

$$Ca(NO_3)_2 \rightarrow CaO + N_2 + (5/2)O_2$$

$$Fe(NO_3)_3 \cdot 9H_2O \rightarrow (½)Fe_2O_3 + 9H_2O + (3/2)N_2 + (15/2)O_2$$

$$Al(NO_3)_3 \cdot 9H_2O \rightarrow (½)Al_2O_3 + 9H_2O + (3/2)N_2 + (15/2)O_2$$

Once the temperature goes above the self ignition temperature of the fuel, the fuel will combust with the support of oxygen from the decomposition of nitrates. If urea is used as the fuel, the reaction is as follows:

$$2CO(NH_2)_2 + 3O_2 \rightarrow 2CO_2 + 4H_2O + 2N_2$$

The combustion of the fuel is an exothermic reaction. After the ignition of the fuel, the heat from the combustion will supply the energy required for the synthesis of cement particles. No external energy source will be needed. The cement formation reactions are as follows:

$$3CaO + Al_2O_3 \rightarrow 3CaO \cdot Al_2O_3 \text{ (Above 900° C.)}$$

$$2CaO + SiO_2 \rightarrow 2CaO \cdot SiO_2 \text{ (Above 1000° C.)}$$

$$2CaO \cdot SiO_2 + CaO \rightarrow 3CaO \cdot SiO_2 \text{ (Above 1250° C.)}$$

$$3CaO \cdot Al_2O_3 + CaO + Fe_2O_3 \rightarrow 4CaO \cdot Al_2O_3 \cdot Fe_2O_3 \text{ (Above 1250° C.)}$$

As shown above, the formation of tricalcium aluminate occurs at temperatures above 900° C., the formation of dicalcium aluminate occurs at temperatures above 1000° C. and the formation of tricalcium silicate and tetracalcium aluminoferrite occurs at temperatures above 1250° C. Since the melting point of the mixture is below 100° C., the reaction is a solution reaction and the reaction rates are extremely high. The reaction can finish in seconds. The reaction time varies for the batch reactor, depending on the scale of the production rate.

Figure 1B:
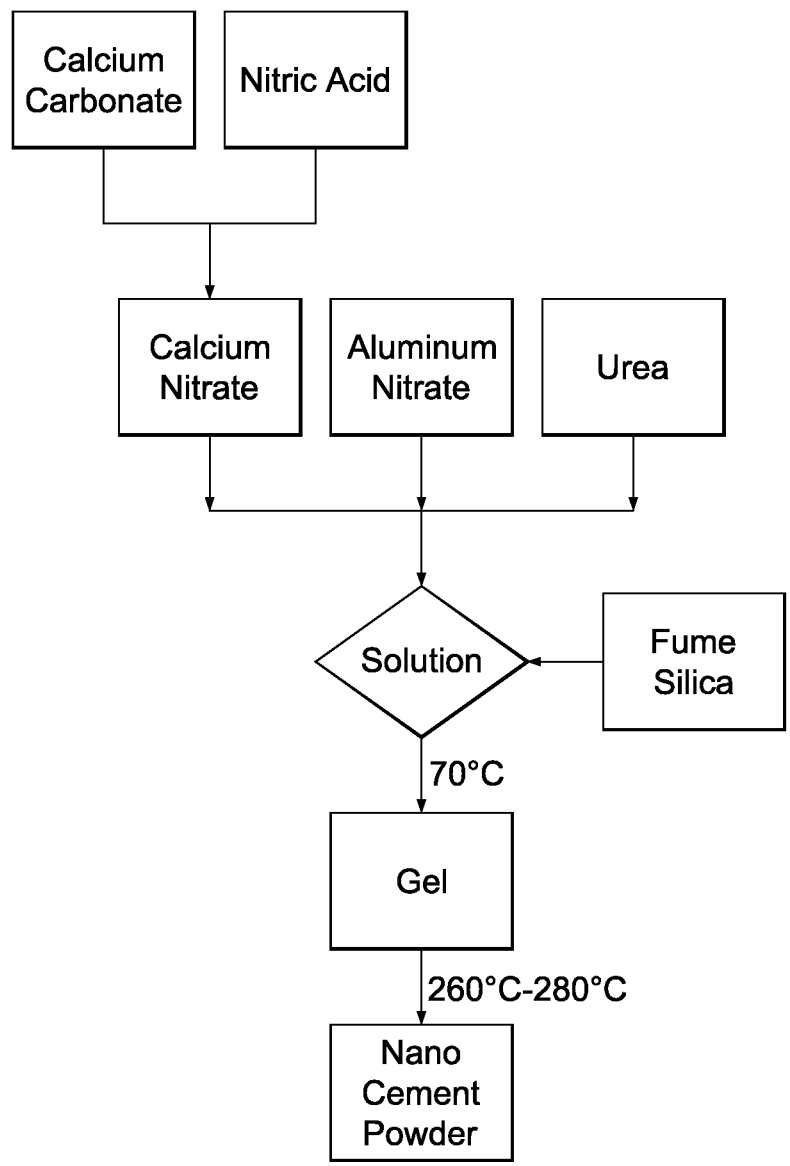
FIG. 1B is a flow chart of an experimental procedure for combustion synthesis of a cementitious composition which does not include an iron source.

A combustion synthesis method for the formation of a white cementitious composition (i.e., a cementitious composition made without an iron source) is shown in FIG. 1B. As shown in FIG. 1B, calcium carbonate is first converted to calcium nitrate. As with the method depicted in FIG. 1A, this conversion reaction is performed since calcium nitrate has higher dissolvability in aqueous solutions and the nitrate will decompose and give off oxygen to support the combustion of the fuel and the thermal decomposition of calcium carbonate during the conventional cement manufacturing requires tremendous energy.

As also shown in FIG. 1B, sources of aluminum and silica are added into the solution. In laboratory scale processes, the aluminum source can be aluminum oxide, aluminum nitrate or aluminum acetate. The silica source can be fumed silica or colloidal silica. In larger scale processes, clay or other materials used in conventional cement manufacturing can be used.

After the mixing the raw materials, water can be removed by evaporation at 70° C. If water is not removed, it will consume more energy during the combustion process. The temperature during evaporation should be controlled below 70° C., because nitric acid ions will decompose at 72° C. or higher.

$$4H^+ + 4NO_3^- \cdot 2H_2O + 4NO_2 + O_2$$

After the evaporation of water, the solution becomes a viscous gel. When the gel is heated, the nitrates will decompose to give oxygen.

$$Ca(NO_3)_2 \rightarrow CaO + N_2 + (5/2)O_2$$

$$Al(NO_3)_3 \cdot 9H_2O \rightarrow (½)Al_2O_3 + 9H_2O + (3/2)N_2 + (15/2)O_2$$

Once the temperature goes above the self ignition temperature of the fuel, the fuel will combust with the support of oxygen from the decomposition of nitrates. If urea is used as the fuel, the reaction is as follows:

$$2CO(NH_2)_2 + 3O_2 \rightarrow 2CO_2 + 4H_2O + 2N_2$$

The combustion of the fuel is exothermic reaction. After the ignition of the fuel, the heat from the combustion will supply the energy required for the synthesis of the white cement particles. No external energy source will be needed. The white cement formation reactions are as follows:

$$3CaO + Al_2O_3 \rightarrow 3CaO \cdot Al_2O_3 \text{ (Above 900° C.)}$$

$$2CaO + SiO_2 \rightarrow 2CaO \cdot SiO_2 \text{ (Above 1000° C.)}$$

$$2CaO \cdot SiO_2 + CaO \rightarrow 3CaO \cdot SiO_2 \text{ (Above 1450° C.)}$$

As shown above, the formation of tricalcium aluminate occurs at above 900° C., the formation of dicalcium silicate occurs at above 1000° C. and the formation of tricalcium silicate occurs above 1450° C. Since the melting point of the mixture is below 100° C., the reaction is a solution reaction and the reaction rates are extremely high. The reaction will finish in seconds. The reaction time varies for the batch reactor, depending on the scale of the production rate.

The cement particles formed by the reaction are powders with a size in the range of nanometer scale. The longer the powders undergo the sintering process, the larger the size of the particles. Unlike the conventional process, in which the clinker is large in size (e.g., 10-40 mm) and needs to be ground to below 60 microns, in the combustion process described herein, the particle size will build up from nano size, and can be easily tuned by controlling the sintering time after the formation of cement. The size of the particle has a significant effect on the properties of the cement. The smaller the particle size, the larger the surface area and the faster the setting time. Based on the end-use application, cements with different properties can be synthesized.

The hot clinker can be quenched to cool it down to a lower temperature since, at a temperature below 1250° C., tricalcium silicate can decompose into dicalcium silicate and free lime. Free lime is unfavorable because it can lower the strength of the cement. In small laboratory scale processes, natural cooling is fast enough. However, for larger scale batch and continuous reactor processes, fast cooling (e.g., quenching) may be necessary.

Figure 2:
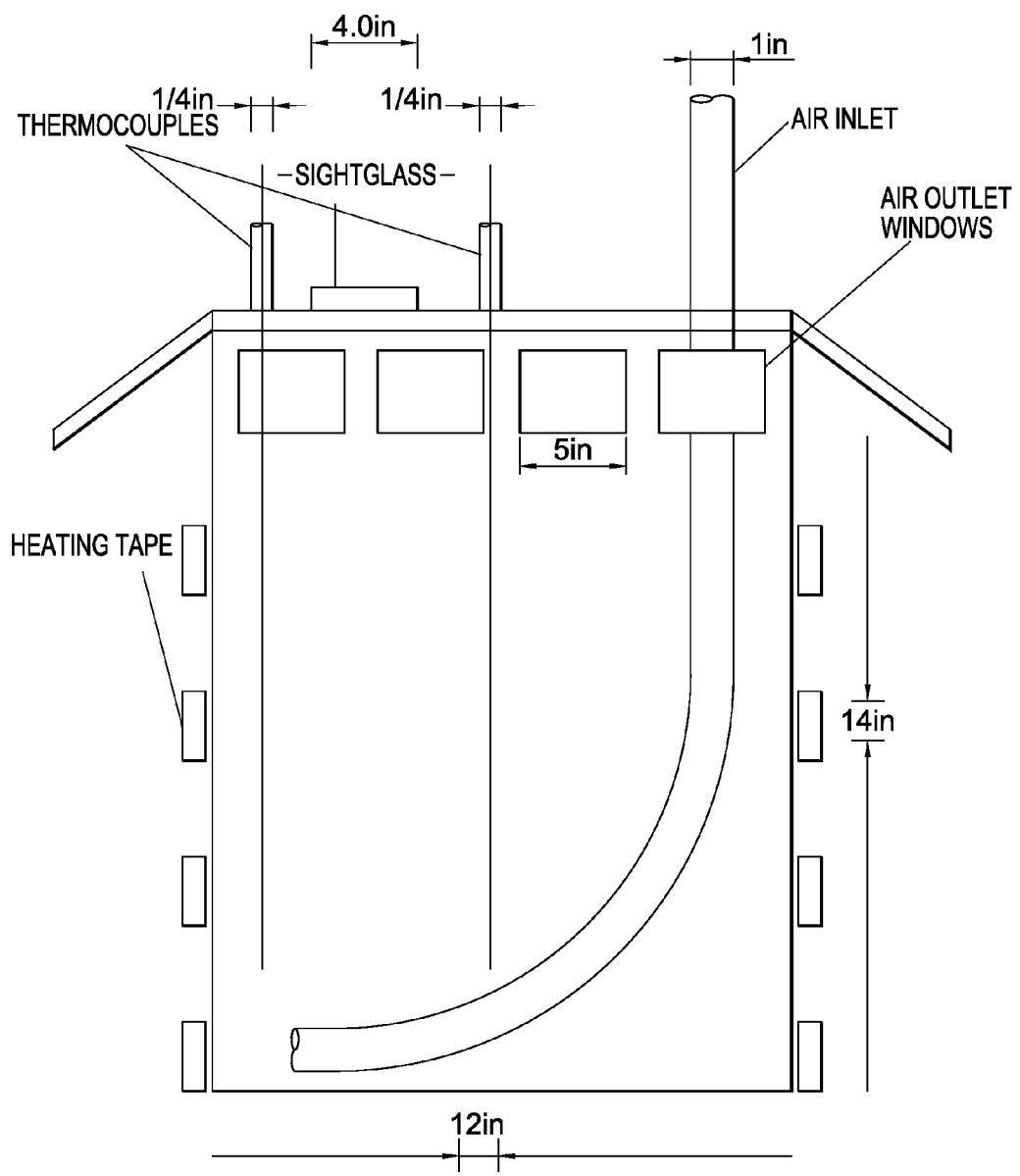
FIG. 2 is a schematic of a batch reactor for the combustion synthesis of a cementitious composition.

The process can be practiced in either a batch reactor or a continuous reactor. A batch reactor with a production rate of 1 kg cement per batch is shown in FIG. 2. The reactor shown in FIG. 2 is a tubular reactor. As shown in FIG. 2, high temperature heating tape is used as heating source. The heating is controlled by a temperature controller. Two thermocouples were used to measure the combustion temperature. A sightglass was used for the observation of the combustion flame. There are eight air outlet windows on the upper side wall of the reactor (only four are shown in FIG. 2) to maintain the atmosphere pressure inside the reactor. An air inlet tube is inserted into the reaction chamber and goes to the bottom of the reactor for introducing air at room temperature to cool down the cement after the clinkering process. The porch, which is shown above the outlet windows, is adapted to collect the cement from gases escaping through the windows.

Figure 3:
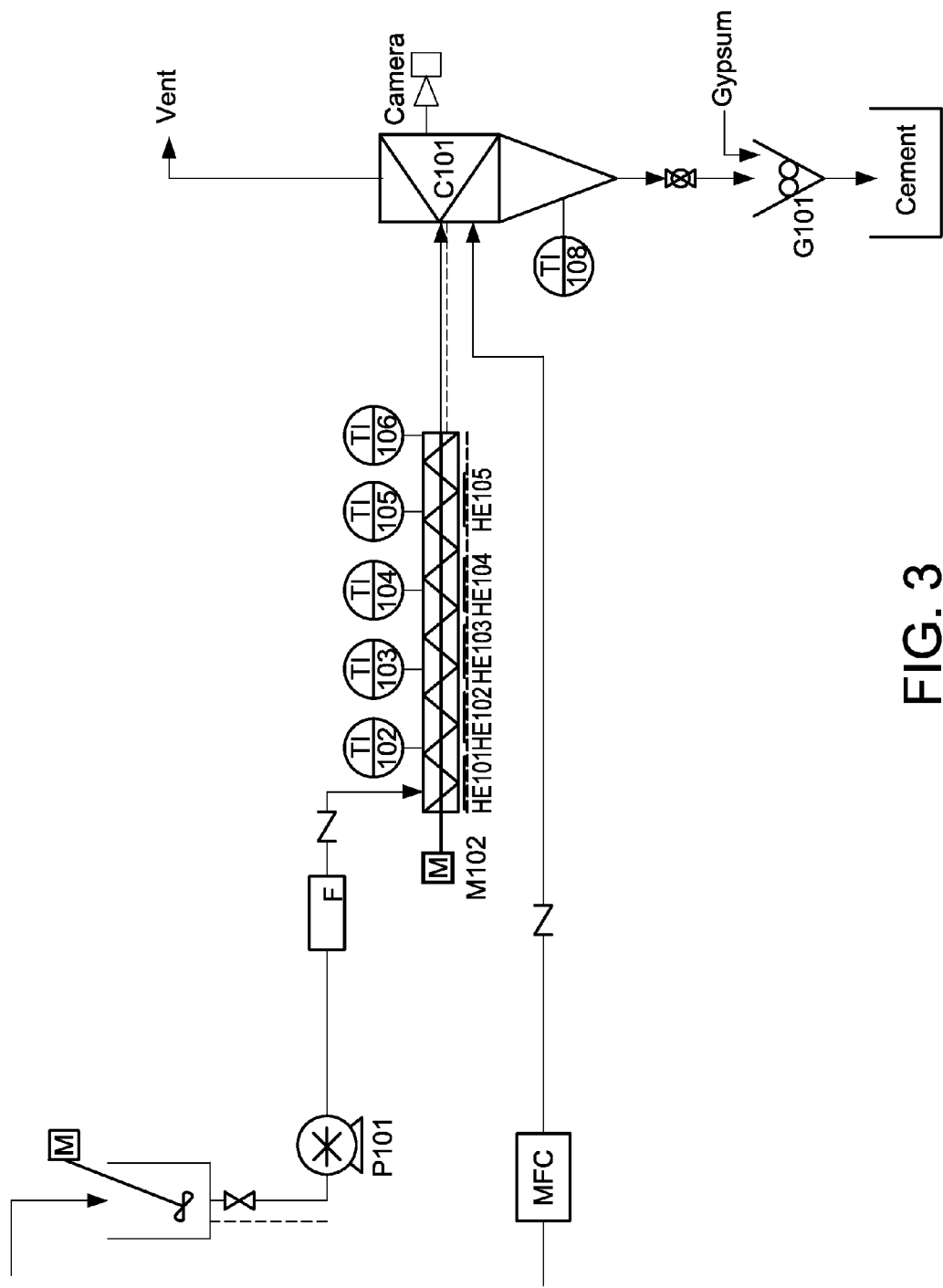
FIG. 3 is a schematic of a continuous screw reactor for synthesis of a cementitious composition.

A continuous reactor is shown in FIG. 3. In this reactor, the raw materials can be mixed in the raw material container with stirring to prevent the material from solidifying. As shown, the feed is pumped into the inlet of the reactor by a screw type progressive cavity pump. The feed rate is controlled by using a variable frequency drive to control the speed of the pump. The continuous reactor is a tubular reactor with a screw conveyor. The screw rpm is controlled by using a variable speed motor. The reactor is equipped with tubular coiled heating elements surrounding it. Heating elements are controlled by thermocouples and temperature controllers. Air at room temperature is used to cool the produced cement down, and a cyclone separator is used for the separation of cement clinkers from the exhaust gases. A camera is placed on the cyclone to monitor the end of the reactor.

As shown in FIG. 3, a raw material mixture is fed to the raw material container. A mechanical stirrer was controlled by a motor to maintain the fluidability of the raw material. If necessary, the container can be heated to 70° C. for lower viscosity of the raw material.

After the raw material is pumped into the screw reactor at a certain flow rate, the raw materials are transported through the reactor by the rotations of the screw. The speed of the screw determines the residence time of the raw materials. The raw material is heated, ignited and combusted inside the reactor forming cement which is being transported out by the screw. There are three zones inside the reactor: (1) a heating zone, in which the raw materials are heated to the self ignition temperature of the fuel; (2) a reaction zone, in which, the fuel combusts, and gives the energy for the synthesis of the cement powders; and (3) a sintering zone, in which the temperature of the cement clinker will be maintained after it reaches above 1250° C. A sufficient amount of fuel should be used such that the energy from the combustion will supply enough sensible heat to heat the raw materials to high enough temperatures needed for the cement synthesis. The sintering time determines the size of the cement clinkers, which gives different properties to the cement.

Flame Spray Reactor for Instantaneous Cement

Figure 4:
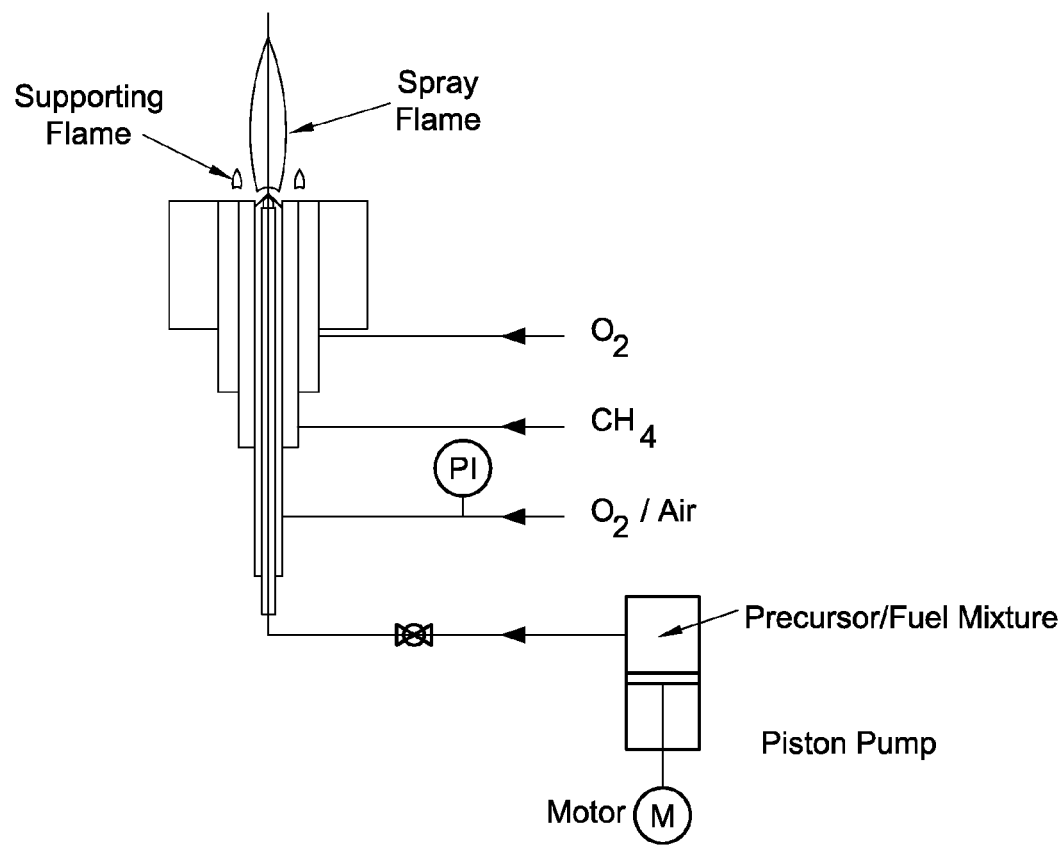
FIG. 4 is a schematic of a flame spray reactor for synthesis of a cementitious composition.

FIG. 4 shows a design for flame spray reactor. As shown in FIG. 4, the reactor has a nozzle with four channels: one liquid channel for the raw material; one channel for air or $O_2$ to atomize the raw materials; and two channels for $CH_4$ and $O_2$ to supply the supporting flame. The raw material is pumped into the central channel and atomized by either air or oxygen. When the atomized raw material is transported through the flame, the fuel is ignited immediately. The cement particles produced by combustion can be collected using a hood and a filter. The fuel to oxidizer ratio can be easily tuned by changing the composition of the raw materials and the flow rate of raw material and the gas to atomize it.

Controlling Cement Particle Size, Color, Porosity, Hardness and Setting Times

Combustion synthesis is a nano technology. The produced cement powders are nanoparticles. The size of the particle can be easily tuned by varying the combustion temperature and the sintering time. The amount of the gas generated can also influence the size of the cement particles since the gas keep the particles separate from each other thus reducing aggregation of the particles.

The color of the cement is related to the combustion temperature and sintering time. Longer residence times will result in darker particles. Iron imparts a gray color to the cement. If iron is removed from the raw materials, the color of the cement is brighter.

The nano cement particles aggregate together and form larger particles with pores. The porosity is affected by the gas generated. With the increase of the amount of gas generated, the nanoparticles produced will be separate and low porosity cement particles can be obtained. The sintering of the cement particles can also influence the porosity of the cement particles. Higher sintering temperature and longer sintering times result in a lower porosity of the cement. If the cement particles are sintered long enough, dense particles can be obtained.

Tricalcium silicate hydrates and hardens rapidly, which is responsible for initial set and early strength of cement. Dicalcium silicate hydrates and hardens slowly, which contributes to later age strength of the cement. These two components contribute to the strength of the cement. Increasing their concentration in the cement can therefore increase the hardness of the cement.

The smaller the particle size, the larger the surface area of the nano cement. The hydration rate of the cement is proportional to the total surface area of the material. The decrease of the size of the particles will result in cement with a faster setting time. According to the different applications of the nano cement, the setting time can be tuned by changing the surface area of the materials.

Removal of Iron and Salts

Iron is used in conventional cement manufacturing to lower the melting point of the raw material mixture. Iron is also the reason why conventional cement has a gray color. In combustion synthesis, the melting point of the mixture is less than 100° C. Therefore, iron can be removed from the raw material.

Supercritical $CO_2$ Cooling

Supercritical $CO_2$ is $CO_2$ at or above its critical temperature and pressure. Supercritical $CO_2$ has different properties than $CO_2$. The critical temperature and pressure for $CO_2$ are 71 bar and 31° C.

In the continuous system, once the cement particles fall into the collection vessel, the reactor edge was sealed to the collection vessel in order to maintain a pressure of 73 bar and a temperature of 31° C. to pass supercritical $CO_2$. The supercritical $CO_2$ cools the cement flakes coming out of the combustion process at a high temperature. It can also aid in increasing the porosity of the cement particles, which in turn increases the reactivity of the particles. The use of supercritical $CO_2$ can also improve the properties of cement like hydration properties (e.g., reducing setting time) and strength.

According to some embodiments, the ratio of the amount of energy generated by combustion of the fuel to the total weight of the calcium nitrate, the aluminum source, the iron source (if present) and the silica source in the raw material mixture is 1.6 to 2.5 MMBTU/ton (e.g., 1.7-1.9 MMBTU/ton).

EXAMPLES

The practice of this invention can be further understood by reference to the following examples, which are provided by way of illustration only and are not intended to be limiting.

Example 1

50 G/Batch Cement Production 90 ml of nitric acid was primarily mixed with 62.33 g calcium carbonate in a 100 ml beaker. The slow addition of nitric acid to the calcium carbonate resulted in the formation of calcium nitrate and water. To this mixture 180 gm of urea, 12.82 gm of aluminum nitrate, 3.33 g of iron nitrate and 12.7 gm of silica fume were added at their appropriate amounts based on the final percentage of individual components required for cement formation. All the raw materials were obtained from Fischer Scientific.

The beaker was kept on a hot plate with continuous stirring. The temperature of the hot plate was maintained at 70° C. until the solution became a gel. This step of evaporation of water is important in cement production. The nitric acid ions can decompose into $NO_2$ and $O_2$ at temperatures above 72° C.

The gel was then placed in a preheated furnace maintained at temperatures ranging from 400-650° C. Two thermocouples are placed at different zones in the beaker. The thermocouples were constantly monitored. Calcium nitrate, aluminum nitrate, ferric nitrate in the presence of urea were heated up to the ignition temperature of urea to give a self sustaining and rather fast combustion reaction resulting in dry, crystalline flakes of cement. The large amount of gases resulted in appearance of flames which can reach the temperature needed for cement formation (i.e., 1450° C.). The flakes of cement material obtained were cooled to room temperature and ground with 2% gypsum then sent for testing. The furnace was switched off as soon as the temperature indicated the ignition temperature of urea.

Different experiments were conducted varying the fuel to cement ratio from 1.5-6 from which the best result was standardized. Also, the furnace temperature was varied from 400-650° C. to obtain the standard ignition temperature at the fastest rate.

The above procedures were followed to prepare the raw feed and experiments were conducted to obtain optimized process conditions.

The first set of experiments, the results of which are shown in Table 2, were conducted to find out the fuel/cement ratio at which the required combustion temperature was obtained.

From these experiments, it was inferred that at a 3.5 fuel to cement (F/C) ratio the desired combustion temperature of 1200° C. was obtained. The F/C is the weight ratio of fuel to raw materials (e.g., calcium nitrate, aluminum source, iron source and silica source) in the mixture.

In the next set of experiments the F/C ratio was maintained at 3.5 and the furnace temperature was maintained to obtain minimum decomposition of raw materials and maximum combustion

TABLE 2

50 g/Batch Cement Production

| Sample # | F/C ratio | Furnace temperature (° C.) | Ignition Temperature (° C.) | Combustion Temperature (° C.) |
|---|---|---|---|---|
| 1 | 6 | 500 | NC | NC |
| 2 | 5.5 | 500 | NC | NC |
| 3 | 4.5 | 500 | 290 | 550 |
| 4 | 3.5 | 550 | 253 | 975 |
| 5 | 3.5 | 450 | 247 | 458 |
| 6 | 3.5 | 550 | 247 | 650 |
| 7 | 3.5 | 500 | 249 | 1300+ |
| 8 | 3.5 | 650 | 251 | 1200 |
| 9 | 3.5 | 700 | 239 | 1200 |
| 10 | 2.5 | 500 | 253 | 1150 |
| 11 | 2.5 | 500 | 247 | 1150 |
| 12 | 1.5 | 500 | NC | NC |

NC—No Combustion
NA—Not Applicable

Sample numbers 4, 5, 6 and 7 were sent for testing. These samples were coded sample I, II, III and IV, respectively.

Morphology Studies with Scanning Electron Microscopy (SEM)

Figure 5A:
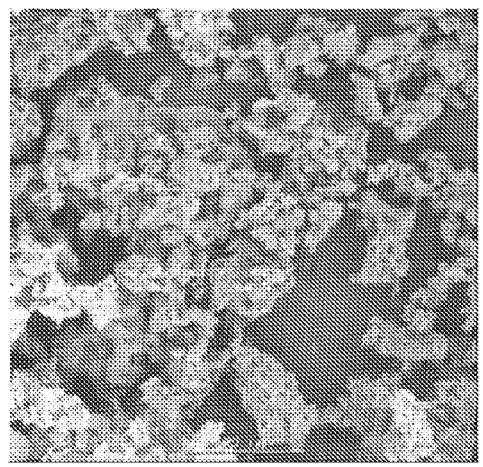
FIGS. 5a-5c are SEM images of SGM cement samples I, II and III.
Figure 5B:
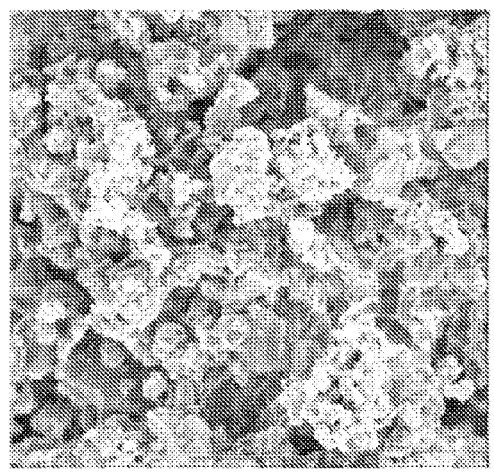
Figure 5C:

To observe the morphology of the novel cements, they were observed under a scanning electron microscope after preparing them on a carbon paste base and sputter coating with gold for a short period of time. The morphology was observed using a JEOL 6400 scanning electron microscope, and is shown in FIGS. 5 (a), (b), and (c) for samples I, II, and III respectively.

The SEM images indicate that the particles of all the three novel cements are amorphous and have a very porous structure. These are the aggregation of nano particles due to the sintering. The agglomerated and porous nature of these particles offers very high surface area, which enhances the reaction rate of cement with water and leads to short setting time.

The combustion temperature of the sample IV was more than 1300° C. The thermocouple used was a k type thermocouple, which has a maximum measuring limit around that range. The thermocouple was burned due to the high combustion temperature of the sample.

Figure 6:
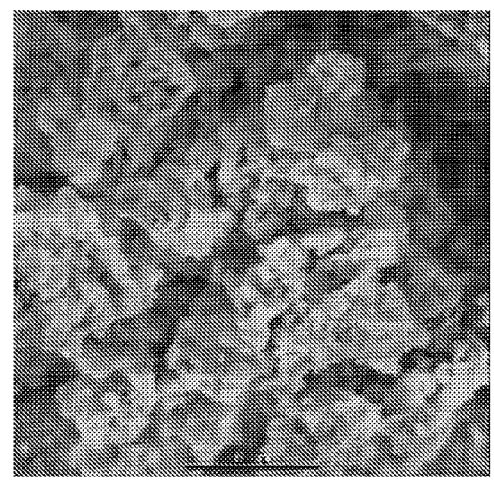
FIG. 6 is an SEM image of SGM cement sample IV.

FIG. 6 shows the SEM of the sample IV. This sample has larger particle size and less porosity due to the higher sintering temperature.

Particle Size Distribution (PSD)

Figure 7:
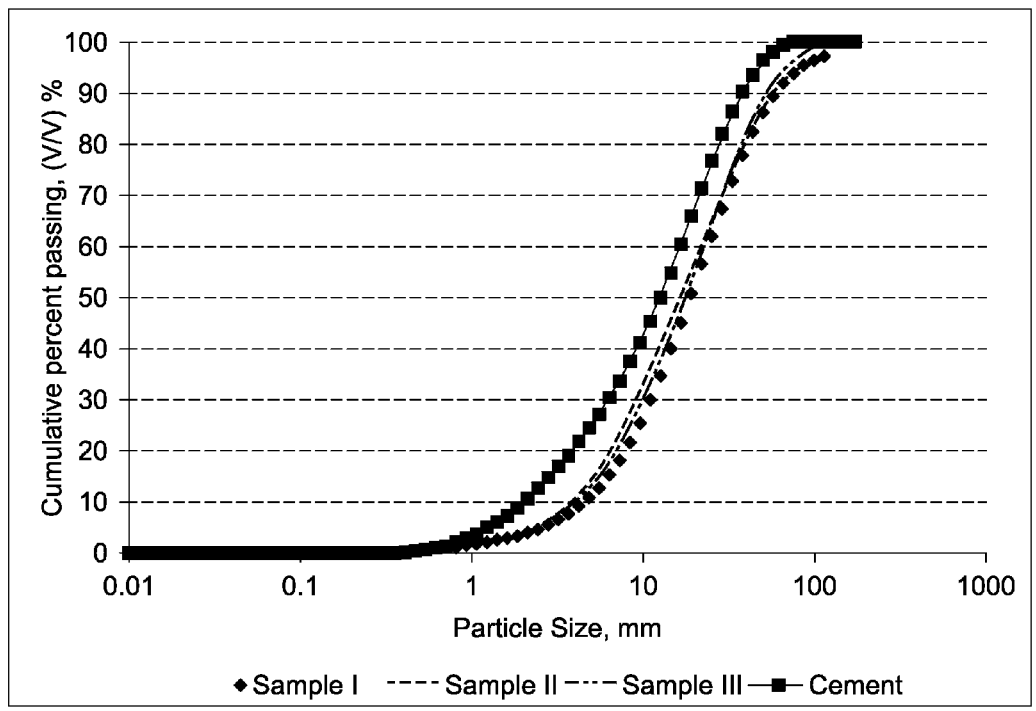
FIG. 7 is a graph showing the size distribution of SGM samples compared to a conventional cement.

The particle size influences the early age hydration as well as setting time and workability. The particle size distribution was evaluated for the novel cement samples and compared to that of ordinary Portland cement (OPC), and shown in FIG. 7. It was observed that samples I, II and III had a tendency to flocculate in the dispersing medium very rapidly. The very fine particle sizes also made it very difficult to sonicate these samples. The particle size distribution is seen to be very similar for all the cement samples, and slightly coarser than that of the cement. However, it is known that the nano cements are finer than OPC as indicated in SEM images, and the observed results are indicative of the flocculating tendency of the particles, which will be very significant in the workability of pastes or mortars made from these materials.

The specific gravity of these materials were indirectly determined from an uncompacted bulk density calculation. Compared with OPC which had a uncompacted bulk density of ~1100 kg/m$^3$, the three nano cement samples showed bulk densities ranging from 550 to 750 kg/m$^3$, indicating that they are much finer than OPC and have reduced specific gravities.

X-Ray Diffraction (XRD) Patterns

The XRD patterns for nano cement samples I, II, III and ordinary Portland cement (OPC) are shown in FIG. 8. The XRD patterns were measured using an X-ray diffractometer from a 2Θ angle of 5° to 40° for all the specimens with step size of 0.02°. The characteristic peaks occurring at various diffraction angles give an indication of the crystalline components present in the material.

As shown in FIG. 8, the intensity of the peaks for dicalcium silicates and tricalcium silicates ($C_2S$ and $C_3S$, the major cement components) in arbitrary units is higher for OPC than all the nano cements. The other significant difference in the XRD patterns is that the OPC shows a peak for gypsum which is absent or minimal for the nano cements. This is understandable from the fact that only 2% gypsum was added in the nano cements.

Gypsum controls the setting characteristics of the cement, and thus helps the concrete to be transported over a period of time without setting and hardening.

The peak for free lime indicates the presence of more free lime in Sample I as compared to Samples II and III. Free lime is also very reactive initially, and is typically not favored in cements. These free limes are unreacted free lime, which is because the combustion temperature they reached was lower than 1250° C., and from thermodynamics which is a must to form tricalcium silicate.

The XRD plot of sample IV is shown in FIG. 9, which shows similar free lime content as conventional cement. The combustion temperature of sample IV was higher than 1300° C., which allows all free lime to react with calcium oxide and dicalcium silicate to form the correct composition of dicalcium silicate and tricalcium silicate.

Initial and Final Setting Times

Initial and final setting times are among the most important properties of cements. Vicat's apparatus is generally used to measure the setting time. However since the sample sizes were small for the novel cements, an alternative method was used in this study. A cylindrical mold, 2.5 cm in diameter and 4 cm high was used instead of standard Vicat's mold in this study due to availability of fewer amounts of samples. The water to cement ratio was kept as 0.40 for the normal cement paste while it was kept at 0.80 for the nano cement samples.

Figure 10:
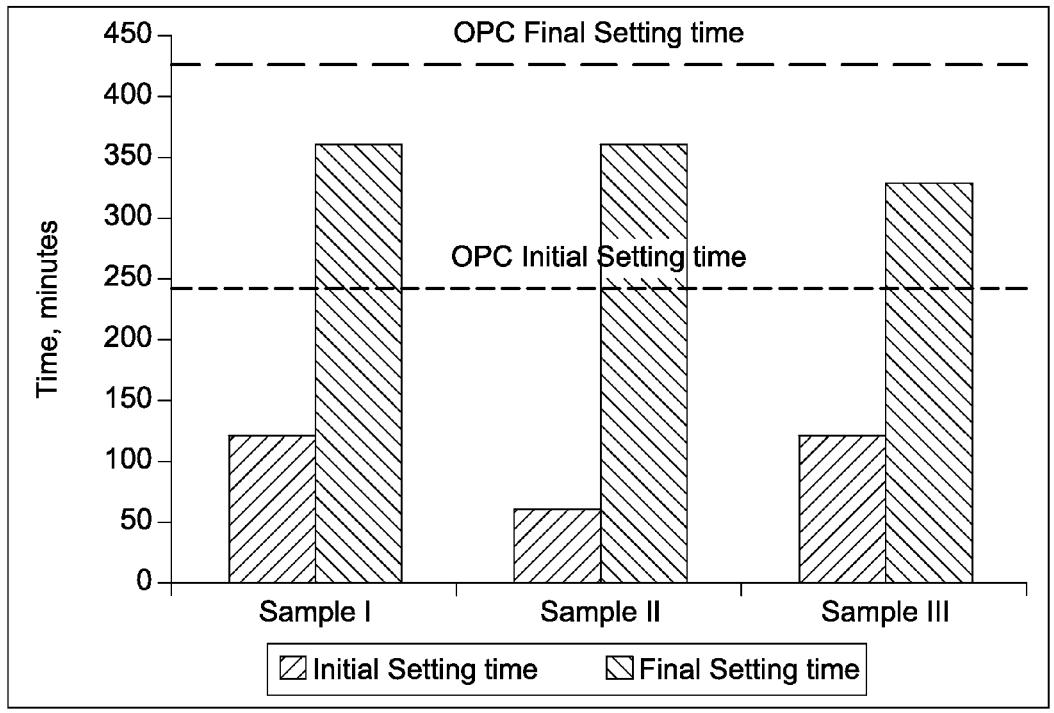
FIG. 10 is a bar chart showing the setting times of SGM samples I, II, III and a conventional cement

FIG. 10 shows the initial and final setting times for the novel cements. The horizontal lines in the figure correspond to the initial and final setting times of OPC, which are about 250 minutes and 430 minutes respectively. These values are in the range of most typical cements. The initial setting times for the pastes with nano cements were found to be much lower as compared to the OPC paste, even with twice the amount of water that went into making the paste. This indicates very fast reactions at very early stages of hydration in these paste samples due to their finer particle sizes.

Figure 11:
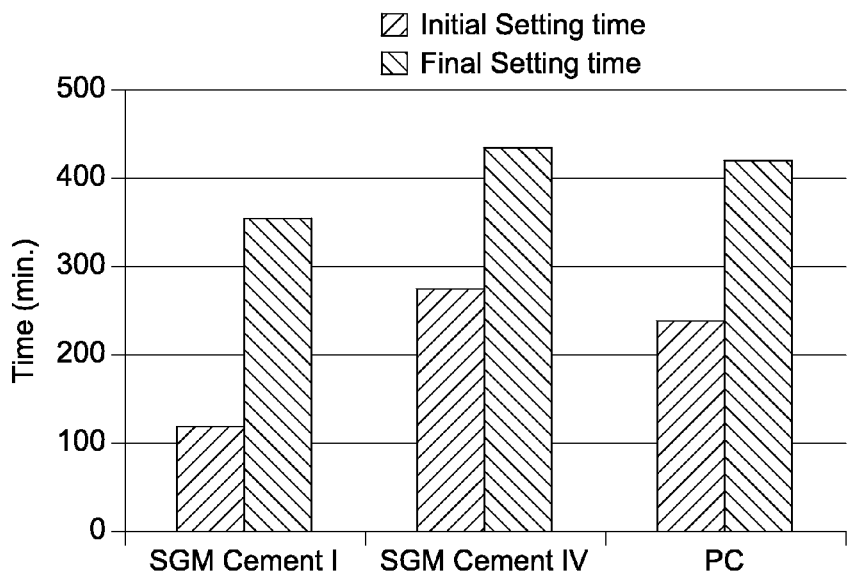
FIG. 11 is a bar chart showing the setting times of SGM cement samples I, IV and Portland cement.
Figure 12A:
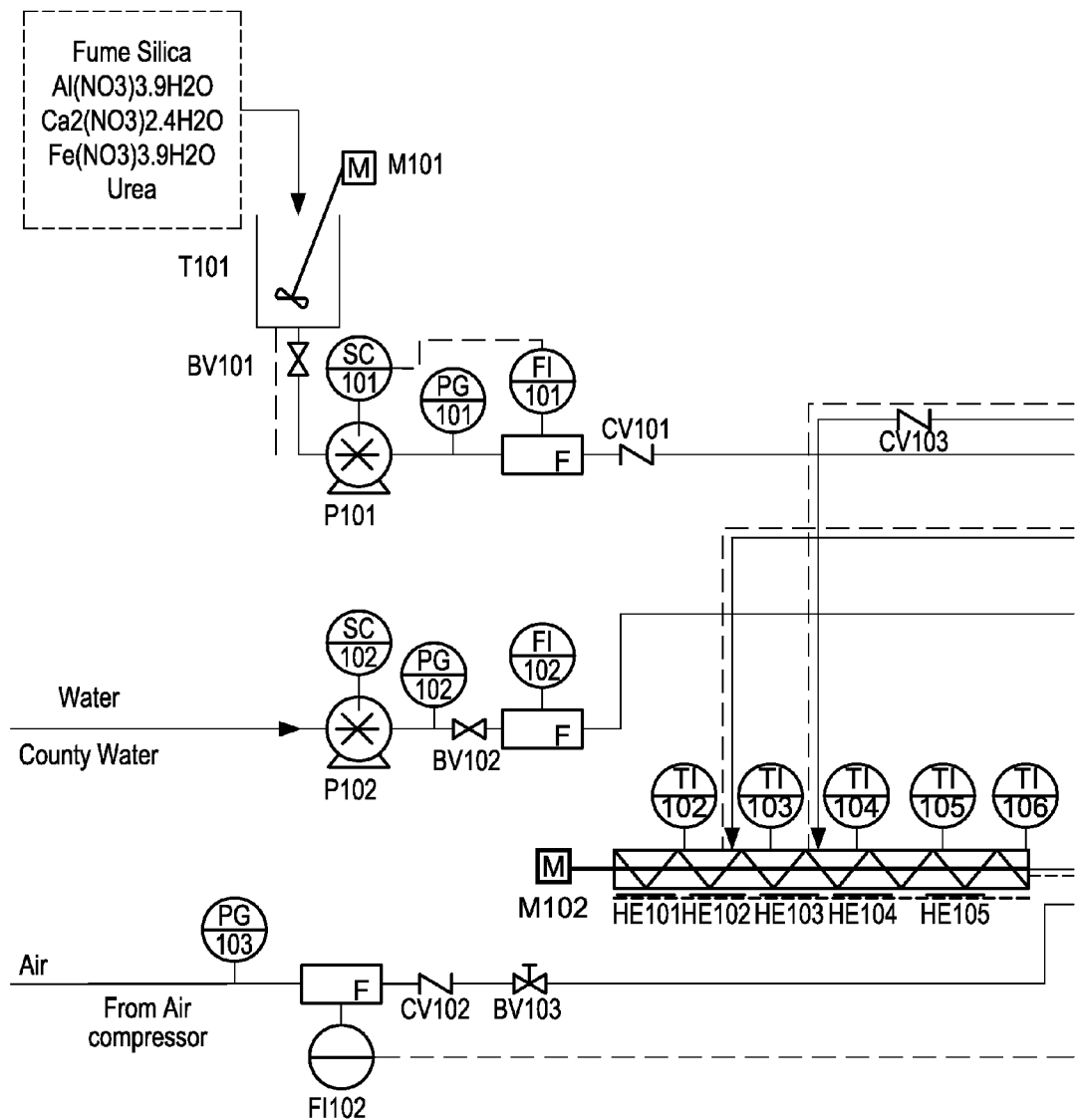
FIG. 12 is a process flow diagram of a plant design.
Figure 12B:
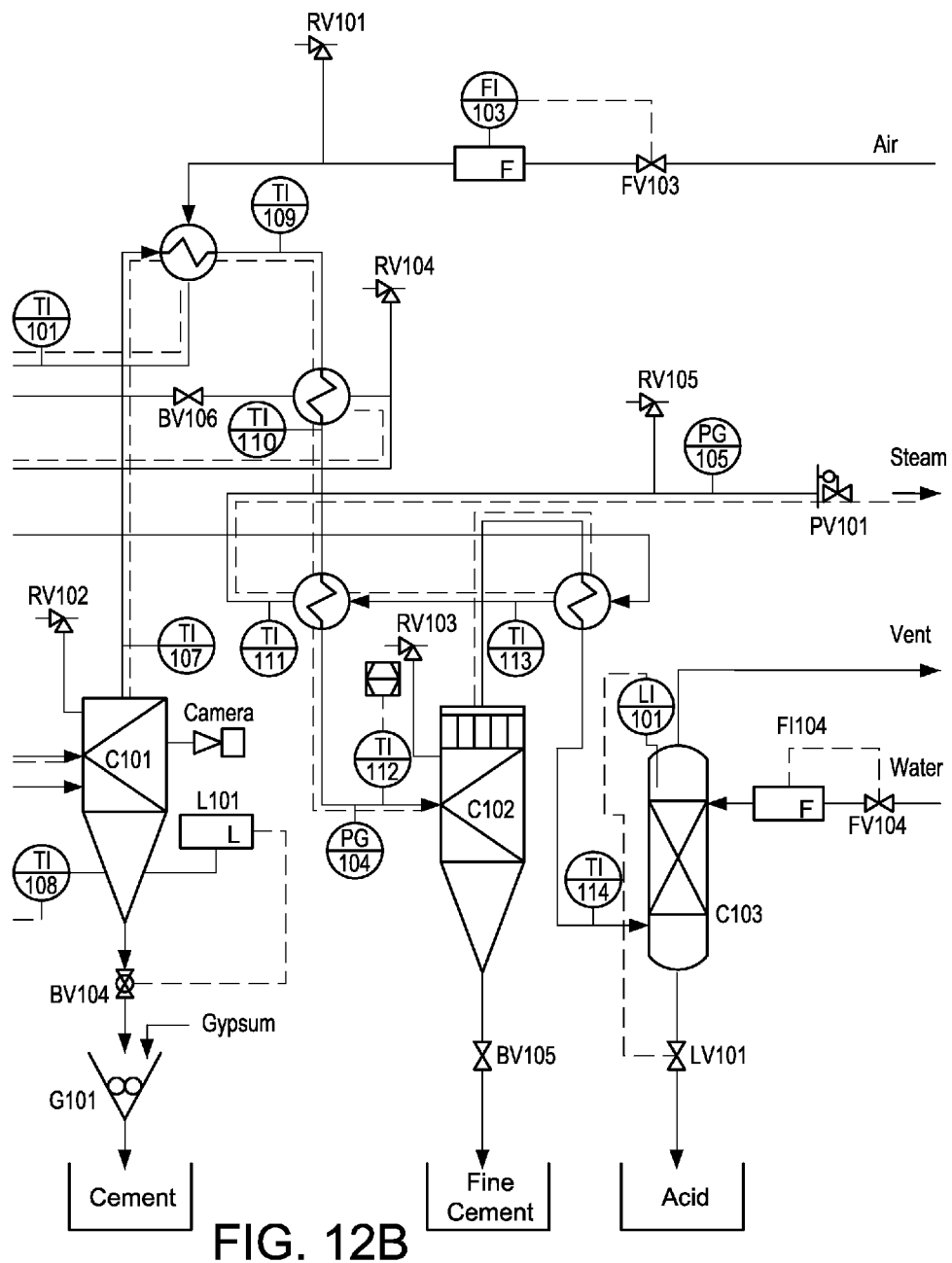
Figure 13:
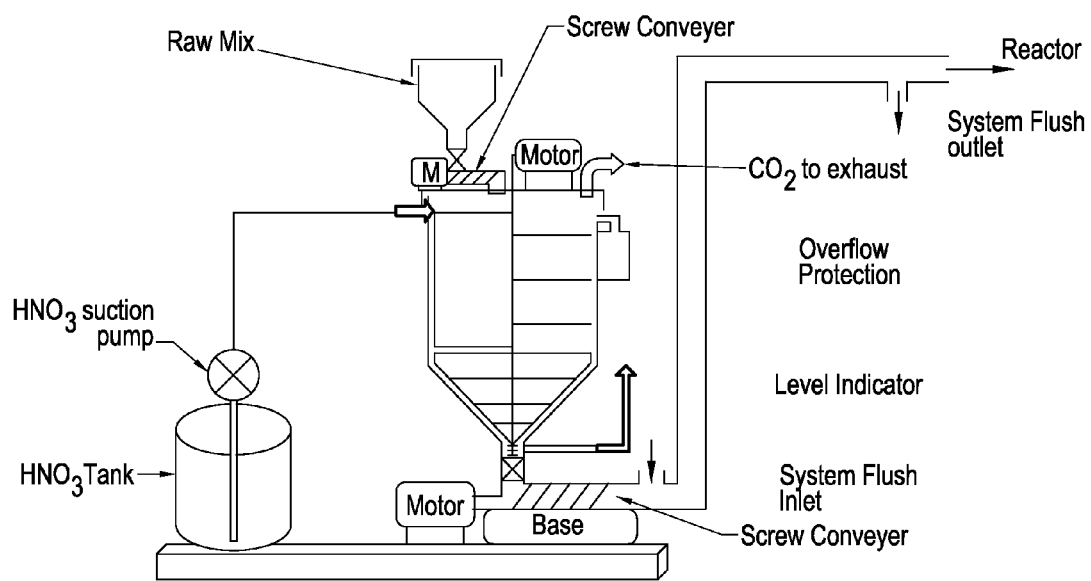
FIG. 13 is a design of a plant for limestone conversion to calcium nitrate.
Figure 14:
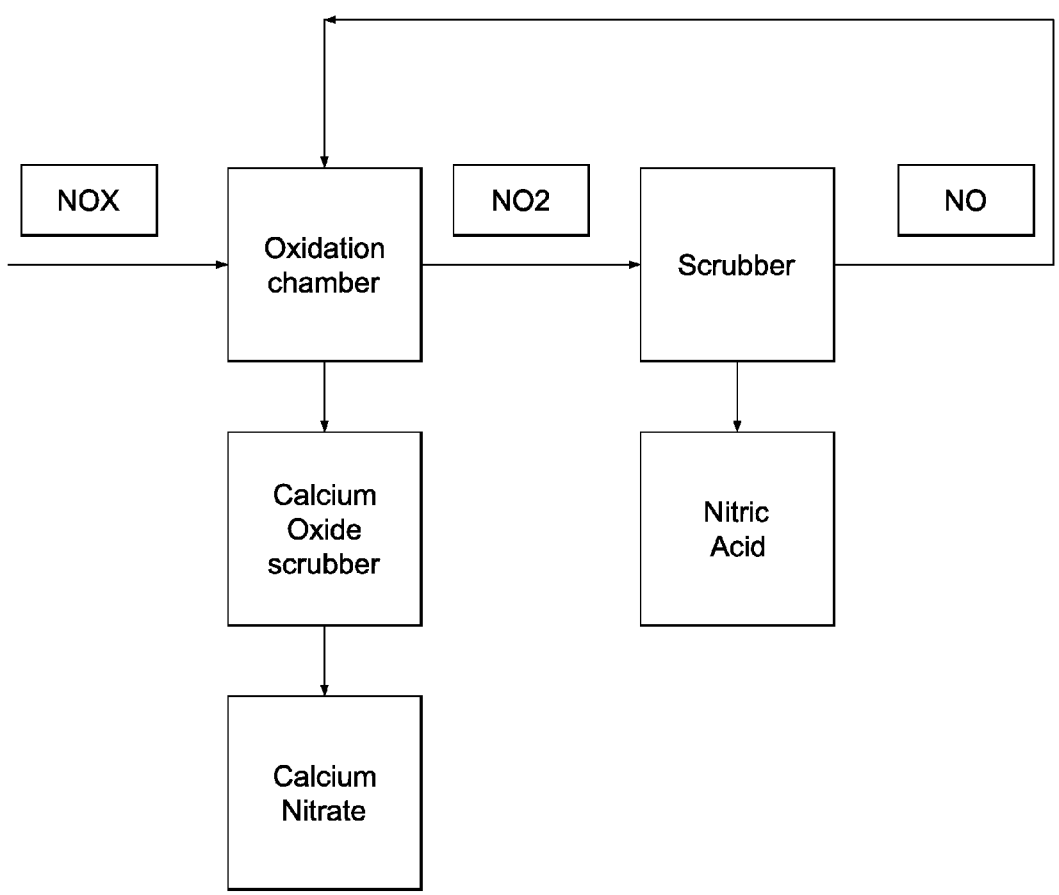
FIG. 14 is a block diagram for an $NO_X$ recovery process.

FIG. 11 shows the comparison of the initial and final setting time of samples I, IV and conventional Portland cement. Sample I had smaller particle size and had setting time faster than conventional cement. Sample IV has similar initial and final setting time as conventional cement, due to the similar morphology of particles. FIG. 11 demonstrates that the initial and final setting time can be tuned by controlling the size of the cement particles by controlling the final combustion temperature.

Example 2

500 G/Batch Cement Production 1000 ml of nitric acid was added to 623.23 g of calcium carbonate in a very slow manner in increments of 5 ml to obtain calcium nitrate and water. The mixture was then thoroughly mixed for 30 minutes for the complete conversion of calcium carbonate to calcium nitrate.

Then 128.15 g of aluminum nitrate, 33.26 g of iron nitrate, 1800 g of urea and 126.86 g of silica fume were added in appropriate amounts based on the final composition of cement. The mixture was then again mixed for 30 minutes with a lab stirrer. All raw materials were bought from Fischer Scientific.

Heating tapes were carefully wrapped around the stainless steel mixing vessel and the temperature of the mixture was maintained at 70° C., using a thermocouple and a temperature controller, with continuous mixing.

After complete evaporation of water and the transformation from liquid to gel, the mixture was then transferred to the batch reactor shown in FIG. 2. The batch reactor was then heated using a burner with propane as the fuel. Two thermocouples were inserted into the mixture. One thermocouple was inserted in the middle and the other towards the side of the batch reactor. The temperatures were then constantly monitored to see at what temperature the fuel ignited. In this case the fuel ignited approximately at 270° C. Once the fuel ignited, temperatures of 1450° C. were observed. The cement obtained was then cooled by passing compressed air.

There was a continuous supply of oxygen throughout the reaction time. The oxygen supply was altered for different experiments to tabulate the results.

Different experiments were also conducted at different urea concentrations to identify the exact fuel to cement ratio needed to achieve a temperature of 1450° C. for cement production.

5% gypsum was then added to the cement produced approximately 25 g and then the sample was sent for testing.

Four experiments were conducted with a cement/urea ratio of 3.5. Only one of these four experiments was conducted with calcium carbonate as the starting raw material. The remaining three used calcium nitrate, instead of calcium carbonate and nitric acid to avoid the water (water from the reaction of calcium carbonate and nitric acid) evaporation step.

The remaining experiment was conducted with an F/C ratio of 4.5 and calcium nitrate as a starting material. All of these batches of raw material prepared were subjected to the same kind of heating medium as mentioned above to get the desired product. Data from these experiments is shown in Table 3.

TABLE 3

| Sample | Starting raw Material | F/C ratio | Ignition Temperature (° C.) | Combustion Temperature (° C.) | Amount of Cement Produced (g) |
|---|---|---|---|---|---|
| 13 | $CaCO_3$ & $HNO_3$ | 3.5 | 247 | 1198 | 410 |
| 14 | $Ca(NO_3)_2$ | 3.5 | 289 | 1136 | 423 |
| 15 | $Ca(NO_3)_2$ | 3.5 | 269 | 1370 | 401 |
| 16 | $Ca(NO_3)_2$ | 3.5 | 246 | 1090 | 453 |
| 17 | $Ca(NO_3)_2$ | 4.5 | 289 | 1115 | 410 |

Due to intense flame some of cement formed was thrown out of the reactor, hence the amount of cement produced is less than expected.

Example 3

Continuous System for Cement Production

Nitric acid was added to calcium carbonate in a very slow manner in increments of ml to obtain calcium nitrate and water. The mixture was then thoroughly mixed for 30 minutes for the complete conversion of calcium carbonate to calcium nitrate.

Aluminum nitrate, iron nitrate, urea and silica fume were then added in appropriate amounts based on the final composition of cement. The mixture was then again mixed for 30 minutes with a lab stirrer. All raw materials were obtained from Fischer Scientific.

Heating tapes were carefully wrapped around the stainless steel mixing vessel and the temperature of the mixture was maintained at 70° C., using a thermocouple and a temperature controller, with continuous mixing.

The mixture was then transferred to the feed hopper as shown in FIG. 3. The pump was then started to adjust the flow rate of the raw mix. The pressure of the system was constantly monitored for blocks. The temperature of the reactor shown in FIG. 3 was maintained at about 500° C.

The flow of the raw mix into the reactor was constantly metered and controlled using a flow controller. This experiment was continuously repeated to match the results of the previously described batch system.

The continuous system with a screw conveyor of larger diameter was tested with different flow rates. The screw conveyor was connected to a motor and a gear system, the gear had speed ratio of 10:1. A vector control device was used to control the speed of the motor which was set according to experimental needs.

Since the flow rate to get continuous production of cement should be small, the flow through the pump was controlled by a variable frequency drive and the pump's knob. A variable-frequency drive (VFD) is a system for controlling the rotational speed of an alternating current electric motor by controlling the frequency of the electrical power supplied to the motor. The pump used for the slurry is a progressive cavity pump. This type of pump transfers fluid by means of the progress through the pump of a sequence of small fixed shape, discrete cavities as its rotor is turned.

The feed is introduced through hopper which passes through the pump at desired flow rate. The line from the pump to the reactor has pressure gauges to monitor any pressure build up during the experimental run and a relief valve. The feed in the hopper is constantly stirred with an agitator at a set speed.

The reactor was heated with coiled heating elements of 275 W of size 1" in diameter and 1" in length. The heating elements were switched on well in advance of the pump being started. A reactor 22" long and 1" in diameter was used for the continuous system.

The screw conveyor and the reactor were cleaned before each run. The cement was collected in a beaker. The maximum production rate was 1 kg/D. At higher flow rates of raw materials (e.g., 155, 103, 51, 35 ml/min) the spacings between the screw got choked with the sticky transition stage material which obstructed the screw movement.

TABLE 4

Experiments On The Continuous System

| Sample # | Run Time (min) | Pump Flow Rate (ml/min) | Screw Conveyer (rpm) | Amount collected g |
|---|---|---|---|---|
| 18 | 10 | 155 | 75 | 11.34 |
| 19 | 6.23 | 103 | 75 | 14 |
| 20 | 18 | 51 | 75 | 14 |
| 21 | 6 | 35 | 75 | 3.9 |
| 22 | 60 | 3.5 | 75 | 22 |
| 23 | 60 | 7 | 100 | 60 |

Example 4

Reduction of Fuel Concentration

Several 50 gram/batch experiments were conducted to find out the right ratio of fuel to cement starting with 3.5 to 1.5. For any constant fuel/cement ratio, two types of experiments were performed, one with urea addition after evaporating water from the nitrates mixture and another by adding urea before evaporation of water. This was done to see the effect of decomposition of urea and nitrates on the combustion process. It was made sure that, for every experiment, 20-51 grams of water had been evaporated from the reaction mixture. Evaporation was done on a hot plate maintained at 70° C. with constant stirring. The furnace was preheated to 600° C. Two thermocouples were used to record the temperatures. The results are tabulated in Table 5

TABLE 5

Optimization Of Fuel Concentration

| Sample Number | Urea/Cement Ratio | Urea addition after/before evaporating water | Maximum Temperature attained (° C.) | Duration of the experimental run (minutes) |
|---|---|---|---|---|
| 24 | 3.5 | After | 960 | 8 |
| 25 | 3.5 | Before | 980 | 8 |
| 26 | 2.5 | After | 1119 | 8 |
| 27 | 2.5 | Before | 935 | 8 |
| 28 | 1.8 | After | 1035 | 7 |
| 29 | 1.5 | Before | 562 | 7 |

All the experiments resulted in combustion except the 1.5 urea/cement ratios. This was evident from the porous nature of the final cement flakes for the 3.5, 2.5 and 1.8 urea/cement ratios, whereas the final product for 1.5 was partially combusted yellowish metal oxide powder. The maximum temperatures attained were in the range of 900-1100° C. The maximum temperature attained was better for the experiments in which the urea had been added after the evaporation of water than those in which the urea was added before evaporation of water.

Some experiments were conducted on 250 gram/batch scale with a 3.5 urea/cement ratio in the same experimental apparatus and in the same oven. The observed maximum temperatures were much higher than the 50 gram/batch experiments. Ideally, the maximum temperatures would be the same for both continuous and batch processes. They are in the range of 1000-1300° C. The increase in the maximum temperatures can be explained by the increase in heat transfer area and the amount of gases trapped in the oven for the 250 gram batches.

A continuous system is generally a better system than a batch system to study the fuel/cement ratio. In batch systems, there can be partial decomposition of fuel during the heating process of the whole batch, which increases the fuel requirement for the synthesis of cement. In contrast, the continuous system is a plug flow reactor. Therefore, even though decomposition of fuel occurs, the decomposed products will travel along with the raw materials throughout the reactor aiding the combustion process and thereby reducing the fuel requirement.

Example 5

Oxidizer Formation Chamber (Nitric Acid Reaction System)

For combustion synthesis to take place, the presence of an oxidizer is necessary since the fuel and the oxidizer have to undergo a redox reaction. For Portland cement production, limestone (calcium carbonate) is the raw material. In the process described herein, calcium carbonate is reacted with nitric acid to produce the oxidizer for reaction in the Oxidizer Formation Chamber.

While working with reagent grade materials, calcium carbonate is mixed with nitric acid in required proportions (discussed below) such that all of the calcium carbonate reacts to calcium nitrate and there is minimum unreacted nitric acid. Then the other components are added to form the raw mix. While working with kiln feed, raw mix that is used in the kiln to make Portland cement is mixed with nitric acid and the mixture is agitated well to ensure complete reaction.

When calcium carbonate reacts with nitric acid, it forms calcium nitrate, carbon dioxide and water. In order to determine the amount of nitric acid required for complete reaction in the oxidizer formation chamber, small amounts of nitric acid (1 ml at a time in this example) are added to a pre-weighed amount of kiln feed (5 g in this example) or calcium carbonate and the change in weight is noted. The change in weight corresponds to the weight of the nitric acid added and the loss in carbon dioxide emitted. More nitric acid is added to this until the change in weight is constant and corresponds to the weight of the nitric acid. This indicates that there is no more carbon dioxide left in the system. In other words, all the calcium carbonate has reacted to calcium nitrate.

After the calcium carbonate has reacted, it is desirable to maximize the solubility of the feed. This can be done by efficient mixing of the feed. For example, the feed containing the oxidizer may be heated to 70° C.-100° C. to increase flowability in the oxidizer formation chamber. Kiln feed of particle size 140 mesh, 200 mesh and 325 mesh were obtained to test for oxidizer formation reaction and solubility. The XRD of the kiln feed is set forth in Table 6 below.

TABLE 6

| XRD of Kiln Feed | |
| --- | --- |
| $Na_2O$ | 0.22 |
| $MgO$ | 1.78 |
| $Al_2O_3$ | 4.09 |
| $SiO_2$ | 13.63 |
| $SO_3$ | 0.37 |
| $Cl$ | 0.03 |
| $K_2O$ | 0.7 |
| $CaO$ | 41.97 |
| $TiO_2$ | 0.22 |
| $Fe_2O_3$ | 1.55 |
| Assumed LOI | 36.1 |

The experiment was performed in two phases. The purpose of the first phase was to determine the amount of nitric acid required to dissolve the kiln feed.

Five (5) grams of the kiln feed was measured in a glass beaker along with a glass stirrer. One (1) ml of Nitric acid was added to the kiln feed in the beaker and stirred vigorously until the froth/bubbles formed due to carbon dioxide emission settles and the resulting blend appears uniform. The beaker is weighed along with the stirrer and the material in it. The weight is recorded and the difference between this weight and the weight before adding the Nitric acid and/or any other suitable solvent is calculated and recorded.

This process of adding Nitric acid and/or any other suitable solvent, 1 ml at a time and measuring the weight is repeated until the difference in weight between two consecutive iterations is found constant.

When the difference is observed to be constant for three (3) or more consecutive iterations, the quantity of Nitric acid and/or any other suitable solvent in ml required just before the repetition in weight difference is achieved, is noted as the result of this phase of the experiment.

The table below shows the amount of nitric acid required for different mesh sizes for the oxidizer formation step.

TABLE 7

| Amount Of Nitric Acid Required For Different Mesh Sizes | | |
| --- | --- | --- |
| Particle size | Kiln feed (g) | Nitric Acid(ml) |
| 140 mesh | 5 | 7 |
| 200 mesh | 5 | 6 |
| 325 mesh | 5 | 5 |

The second phase of the experiment helps deduce the solubility of the kiln feed in Nitric acid and/or any other suitable solvent.

In this phase of the experiment, the time for which the kiln feed and Nitric acid and/or any other suitable solvent are mixed together in a glass beaker using a magnetic stirrer is varied. The different combinations for which experiments were performed and their corresponding results are shown in the table below.

TABLE 8

| Amount of Nitric Acid Required for Different Mesh Sizes | | |
| --- | --- | --- |
| | Time of mixing | Solubility |
| 140 mesh | 0.5 hours | 80% |
| | 3 hours | 92% |
| | 24 hours | 98% |

TABLE 8-continued

Amount of Nitric Acid Required for Different Mesh Sizes

|  | Time of mixing | Solubility |
|---|---|---|
| 200 mesh | 0.5 hours | 86% |
|  | 3 hours | 98% |
|  | 24 hours | 98% |
| 325 mesh | 0.5 hours | 95% |
|  | 3 hours | 98% |
|  | 24 hours | 98% |

From this table, we see that for different particle sizes, it is possible to achieve close to 100% solubility at different time periods.

Thus, in the oxidizer formation chamber, reaction of limestone/calcium carbonate/kiln feed takes place to form oxidizer (calcium nitrate) and this feed is mixed well to form a soluble feed mixture. The feed may be heated to 70° C.-100° C.

Instead of using nitrates as the oxidizer, acetates, benzoates or other such components which release oxygen required for combustion during a redox reaction can also be used.

Example 6

Combustion Synthesis Chamber

The oxidizer from the oxidizer formation chamber is mixed with a fuel and this mixture is made to undergo combustion synthesis in a combustion synthesis chamber. The mixing of fuel and oxidizer can be off-line or inline. When the fuel is mixed offline, an agitator can be used to bring about homogeneity of the feed mixture. Otherwise, an inline mixer can be used.

The combustion chamber consists of a reactor with a screw type mechanism to bring about transport of the product to the cooling chamber. The reactor is pre-heated, using external heaters, to about 500° C.-1000° C. Internal thermocouples at different points of the combustion synthesis chamber show the temperature profile on the inside of the reactor.

The feed from the oxidizer formation chamber is mixed with fuel (either internally or externally) and air and fed into the combustion synthesis chamber which is pre-heated. When the feed reaches a temperature of ~260° C., combustion synthesis occurs and $C_2S$ and $C_3S$ begin to start forming. A sudden rise in the internal temperatures as exhibited by the thermocouples is an indication of combustion synthesis in the combustion synthesis chamber.

Once the reaction has been triggered, it becomes self sustaining and the external heaters can be switched off. The cement from the combustion synthesis chamber then enters the cooling chamber.

In another instance, the combustion synthesis chamber can be a kiln type reactor, wherein a screw is not present and transport is achieved by the rotating kiln.

Example 7

Collection Chamber

The cement collection system in our process consists of 4 zones.
Zone 1: Entry zone for cement and gases.
Zone 2: Gas exit zone.
Zone 3: Primary cooling zone where the option of supercritical cooling can be exercised.
Zone 4: Collection system where the cement will be collected after cooling.

Zone 1 is the gas and solid entrance stage. It is designed with a rectangular entry region and a funnel shaped exit region. The cement and gases that exit the reactor enter zone 1. This zone has an outlet at the top of the rectangular part of the zone for the gases to leave the system towards the nitric acid recovery system. The bottom part of the zone is funnel shaped which guides the cement particle into the cooling zone (zone 3).

Zone 2 is the gas collection system. It is connected to zone 1 and uses an exhaust fan to pull out the gases in zone 1. The gases go through a bent tube which allows for condensation of water vapor. The condensed water vapor is collected using a collection vessel. The dry gases then go through the exhaust fan to the nitric acid recovery system.

Zone 3 is the primary cooling zone of the collection system. Zone 3 consists of rectangular chamber with a plate placed at an angle inside. The plate has multiple holes in it which allow a cooling agent (any fluid/supercritical $CO_2$/Air) to pass through it. The cement particles that fall on the plate roll down due to gravity and exit the cooling chamber. During the duration of time where the cement particles roll down the plate they make contact with the cooling agent (any fluid/supercritical $CO_2$/Air). Near instantaneous cooling to a desired temperature is achieved in this zone. This zone has two inlets and two outlets. The first inlet is where the cement enters from zone 1. The second inlet is for a cooling agent to enter the chamber. The first outlet is for the cement to leave the zone and enter zone 4. The second outlet is for the cooling agent to exit the cooling chamber.

Supercritical $CO_2$ is $CO_2$ at or above its critical temperature and pressure. Supercritical $CO_2$ has different properties than $CO_2$. The critical temperature and pressure for $CO_2$ are 71 bar and 31° C.

In the continuous system, once the cement particles fall into the collection vessel, the reactor edge was sealed to the collection vessel in order to maintain a pressure of 73 bar and a temperature of 31° C. to pass supercritical $CO_2$. The supercritical $CO_2$ cools the cement flakes coming out of the combustion process at a high temperature. It can also aid in increasing the porosity of the cement particles which in turn increases the reactivity of the particles. The use of supercritical $CO_2$ can also improve the properties of cement like hydration properties (reduces setting time) and strength.

Zone 4 is the final collection vessel. The cement exiting the cooling chamber (zone 3) falls into the collection vessel. The collection vessel has a trap door at its base which can be manually or automatically opened. Once the cement level reaches a specific limit in the collection vessel, the trap door is opened and the cement is emptied out.

Example 8

Continuous System for Cement Production Using Raw Materials Used to Make Portland Cement The apparatus for a continuous system for cement production using combustion synthesis consists of an oxidizer formation chamber as discussed in Example 5, a combustion synthesis chamber as discussed in Example 6 and a collection chamber as discussed in Example 7.

Nitric acid was added to calcium carbonate in a very slow manner in increments of 5 ml to obtain calcium nitrate and water in the oxidizer formation chamber. The mixture was then thoroughly mixed for 30 minutes for the complete conversion of calcium carbonate to calcium nitrate. Then aluminum nitrate, iron nitrate, urea and silica fume were added in appropriate amounts based on the final composition of cement. The mixture was then again mixed for 30 minutes with a lab stirrer. All raw materials were bought from Fischer Scientific.

In another instance, kiln feed for a cement plant was used as a raw material and nitric acid was added to it. The raw material had the required calcium carbonate, iron source, aluminum source and silica source and this was verified by performing an XRD of the sample. After adding the required nitric acid, in the ratio 7 ml acid per 5 g material, the mixture was stirred for around 2 hours to let the silica completely solubilize. Urea was then added to the solution and stirred for another 0.5 hours.

In another instance, post-calcined feed, consisting mainly of CaO, was used as raw material to the system. Nitric acid was added to the mix and the mixture was stirred for around 2 hours. Finally urea was added to this solution and the mixture was stirred for another 0.5 hours before feeding into the continuous system.

It is seen that dolomites can also be used as raw materials instead of actual kiln feed. When dolomites are mixed with nitric acid, they form both calcium magnesium nitrates, which can be converted to cement of calcium as well as magnesium during combustion synthesis.

Heating tapes were carefully wrapped around the stainless steel mixing vessel and the temperature of the mixture was maintained at 70° C., using a thermocouple and a temperature controller, with continuous mixing. The mixture was then transferred to a feed hopper. The pump was then started to adjust the flow rate of the raw mix. The pressure of the system was constantly monitored for blocks. The temperature of the reactor was maintained at about 500° C.

The flow of the raw mix into the combustion synthesis chamber was constantly metered and controlled using a flow controller.

The continuous system with a screw conveyor of larger diameter was tested with different flow rates. The screw conveyor was connected to a motor and a gear system, the gear had speed ratio of 10:1. A vector control device was used to control the speed of the motor which was set according to experimental needs.

Since the flow rate to get continuous production of cement should be small, the flow through the pump was controlled by a variable frequency drive and the pump's knob. A variable-frequency drive (VFD) is a system for controlling the rotational speed of an alternating current electric motor by controlling the frequency of the electrical power supplied to the motor. The pump used for the slurry is a progressive cavity pump. This type of pump transfers fluid by means of the progress through the pump of a sequence of small, fixed shape, discrete cavities as the rotor is turned.

The feed is introduced through a hopper which passes through the pump at desired flow rate. The line from the pump to the reactor includes pressure gauges to monitor any pressure build up during the experimental run and a relief valve. The feed in the hopper is constantly stirred with an agitator at a set speed.

The reactor was heated with coiled heating elements of 275 W of size 1" in diameter and 1" in length. The heating elements were switched on well in advance of the pump being started. A reactor 22" long and 1" in diameter was used for the continuous system.

The screw conveyor and the reactor were cleaned before each run. The cement was collected in a beaker. The maximum production rate was 1 kg/D. At higher flow rates of raw materials (e.g., 155, 103, 5 1, 35 ml/min) the spacings between the screw became choked with the sticky transition stage material which obstructed the screw movement. The cement formed in the reactor was conveyed to the collection chamber.

In another instance, the reaction was carried out in a tubular reactor without a screw such that it resembled a kiln. In this case, one can retro fit an existing cement plant using a much smaller kiln or increasing capacity of plant.

Example 9

Study of Water Removal on Feed

Crystalline and non crystalline water has profound effect on the combustion synthesis. The effect of water removal on the reaction rate was thoroughly studied for a batch process. An optimized continuous system where a water removal step is added before the reaction mixture is conveyed into the combustion chamber was also developed.

TABLE 9

Effect of Water Removal

|  | Portland Cement | Without water removal | With water Removal |
|---|---|---|---|
| LOI | 1.64 | 27.7 | 1.15 |
| IR | 1.33 | 9.33 | 1.68 |
| Free Lime | <2 | 4.3 | 4.7 |

Experiments were performed to determine the decomposition temperatures of ferric nitrate, aluminum nitrate and calcium nitrate. The results of these experiments were cross examined with the melting point of the three compounds under scrutiny.

TABLE 10

Decomposition and Melting Point Comparison

|  | Calcium Nitrate | Ferric Nitrate | Aluminum Nitrate |
|---|---|---|---|
| Melting Point | 42.7° C. | 47.2° C. | 73° C. |
| Decomposition Temperature | 532° C. | 100° C. | 132° C. |

It was observed that the Calcium nitrate has the highest decomposition temperature and forms a higher percentage of the raw materials than others in the raw mix. However, aluminum nitrate has a higher melting point. Hence heating the raw mix to ~70° C. makes it free flowing and more suitable for use in a continuous system while at the same time does not result in the decomposition of the compounds in the raw mix. While not wishing to be bound by theory, it is also possible that the pre-heating of the raw mix would allow the removal of non-crystalline water which would in turn aid combustion synthesis.

In order to optimize raw mix properties, experiments were conducted to study the result of heating the raw mix to different temperatures (e.g., 40° C., 60° C., 80° C., 100° C., 120° C.). The table below summarizes the observations from these experiments.

TABLE 11

Change In Raw Mix Properties With Change In Temperature

| Temperature | Color change | Weight Loss |
|---|---|---|
| 40° C.-100° C. | Ash | No weight loss |
| 120° C. | Pale red | Significant weight loss |

The inference from this experiment was that the change in color was due to decomposition of Ferric Nitrate and the loss of weight was due to loss of non crystalline water. Hence the required properties could be obtained at the risk of decomposition of raw material. In order to overcome this hurdle, a similar set of experiments was performed under vacuum. The table below summarizes the results of these experiments.

TABLE 12

Change in Raw Mix Properties in Vacuum with Temp. Change

| Temperature | Color Change | Weight Loss |
|---|---|---|
| 70° C.-80° C. | No change in color | Significant weight loss |
| 90° C.-110° C. | Change in color | Significant weight loss |

It was inferred from these experiments that the non crystalline water could be removed from the raw mix without decomposing the ferric nitrate at 70° C.-80° C. Further, under vacuum, the process time of evaporation can be greatly reduced as the boiling point of water is lowered to 65° C. or less and hence the evaporation rate is very fast.

Example 10

Melting of Raw Material and Fuel to Increase Flowability with and without Evaporating Water The mixture of Portland cement raw materials and nitric acid is a thick slurry which cannot be easily pumped. Addition of water makes the mixture more fluid but at the cost of combustibility and resultant product properties. Further, the addition of water increases the amount of energy required for combustion synthesis. Several experiments were conducted to check the flow-ability of raw mixture heated at different temperatures. The mixture was pumped through a progressive cavity pump keeping the flow rate of the pump constant and measured the actual flow rate of the fluid. The densities and flow rates are tabulated below.

TABLE 13

| Raw Material Temperature (° C.) | Density (kg/l) | Flow (ml/sec) |
|---|---|---|
| 15-20 | 1.42 | 0.0 |
| 35 | 1.37 | 2.1 |
| 60 | 1.27 | 3.05 |
| 70 | 1.28 | 3.08 |
| 90 | 1.21 | 3.07 |
| 100 | 1.08 | 2.9 |
| 120 | 0.5 | NA |
| 135 | 0.56 | NA |

As can be seen from the above data, at 15-20° C. the mixture did not flow at all whereas from at temperatures from 35-100° C., the mixture flowed. The optimal flow rate was about 70° C. When the material reached around 120° C. and above, it formed a froth and was difficult to pump.

It is seen that, with no water addition, the flowability of the feed increases at ~70° C.-90° C. In fact, under vacuum it is also possible to evaporate some water but there is a significant increase in flowability. This is because the metal nitrates start melting in this region and hence, can be pumped easily. At higher temperatures, the feed approached the decomposition and/or phase change temperature. Hence, flowability was reduced.

Urea can be made into a liquid (i.e., melted) at temperatures of 132-135° C. which is its melting point. An experiment was done to test the flow-ability of urea at its melting point using the same pump and experimental set up used for the raw mixture. At 135° C. urea achieved a density of 0.77 g/cm$^3$ and a flow rate of 7 ml/sec.

Since a liquid-liquid reaction is most preferred for combustion synthesis, the operating region for feed pumping was chosen to be about 70° C. and the operating region for urea was chosen to be 135° C.

Example 11

Optimization of the Continuous System to Reduce the Loss on Ignition (LOI) by Introduction of Air An LOI in the range of 14-20%, which is considered as a high value, was observed in many samples. This issue was attributed to the presence of un-combusted nitrates or un-converted carbonates, causing losses in the oxidizer. The flue gasses measured in such cases had elevated levels of carbon monoxide concentrations. Some minor changes, like introducing air through the system, were done to reduce the concentrations of carbon monoxide. While not wishing to be bound by theory, it was inferred from these experiments that carbon monoxide can be used as an indicator of incomplete reaction. Thus, introducing air into the reactor can assist in achieving higher calcining temperatures and hence achieve more conversion and a lower LOI. The different conditions tested are tabulated below.

TABLE 14

Reducing LOI

| Sample Number | Air Pressure (psi) | CO (ppm) | Calcining Temperatures (° C.) | LOI (%) |
|---|---|---|---|---|
| 39 | 0 | 7000 | 650 | 14.1 |
| 40 | 10 | 185 | 1350 | 5.9 |
| 41 | 20 | 40 | 1350 | 3.6 |
| 42 | 30 | 35 | 1350 | 2.8 |

Example 8

Reduction of CO in Flue Gas by Adding Air

The Carbon Monoxide in the flue gases reduced the NOx emitted due to the reaction. The reduction reaction resulted in high levels of carbon dioxide and nitrogen. However, since the amount of NOx generated was a direct indication of the reaction rate, an essential modification had to be done to the system. The ratio of NOx:CO was observed to be 1:5 without any air being introduced in the reactor. To improve the reaction rate experiments were conducted where air supply was introduced in the reactor and $O_2$, CO, NO, $NO_2$ readings were taken at pre set intervals of time. The table below shows the change in flue gas composition before and after the introduction of air in the reactor.

TABLE 15

Effect of Air in the Reactor

| Time (min) | Without External Air | | | | With External Air (50 LPM) | | | |
|---|---|---|---|---|---|---|---|---|
| | $O_2$ (%) | CO (ppm) | NO (ppm) | $NO_2$ (ppm) | $O_2$ (%) | CO (ppm) | NO (ppm) | $NO_2$ (ppm) |
| 1 | 20.9 | 1872 | 260 | 104.7 | 20.9 | 302 | 378 | 35.7 |
| 6 | 18.82 | 873 | 717 | 15.8 | 18.56 | 43 | 2800 | 347.1 |
| 11 | 18.74 | 2728 | 50 | 0 | 17.69 | 26 | 10200 | 4154 |
| 16 | 18.83 | 1845 | 375 | 0 | 15.10 | 5 | 14230 | 2585 |

The results of this experiment showed that the Oxygen in the process before the air line was introduced was insufficient for the reaction to reach its full potential. The supply of air not only increased the NOx in the system and reduced the CO, it also increased the temperatures developed in the reactor and improved the properties of the end product.

Example 13

Experiment with Fuel and Feed Pumped Separately (Reduction of Fuel to Oxidizer Ratio)

While running the continuous system with fuel mixed with feed and with air pumped into the reactor, it was seen that the temperature inside the reactor was rapidly increasing. The temperatures inside the reactor would often go over 1400° C. and would still show no signs of stabilizing. In order to prevent the temperatures from going too high, it was decided to pump the fuel in separately, so that it could be monitored and reduced as required. This is in accordance with the principle of combustion synthesis, since once the reaction is triggered, very little fuel is required to sustain the reaction.

In this case, the experiment was repeated such that urea was not mixed directly with the feed, but was pumped into the continuous system separately. The fuel and feed were then mixed using an in-line mixer before entering the feed. When the temperatures inside the reactor began to rise over 1200° C., the fuel would be reduced and if the temperature fell below 1150° C., the fuel would be increased. In this way, steady state could be achieved by regulation fuel flow in the reactor. The table given below shows the changes in fuel amounts pumped into the reactor at different periods of time during the run.

TABLE 16

Changes In Fuel Amounts At Different Periods Of Time During Run

| time (min) | Feed (ml/min) | Fuel (ml/min) | Fuel to oxidizer ratio | Temperature inside reactor (° C.) |
|---|---|---|---|---|
| 0 | 30 | 35 | 1.24 | 650 |
| 5 | 30 | 35 | 1.24 | 870 |
| 10 | 30 | 35 | 1.24 | 1290 |
| 15 | 30 | 30 | 1.07 | 1340 |
| 20 | 30 | 28 | 1.00 | 1380 |
| 25 | 30 | 23 | 0.82 | 1385 |
| 30 | 30 | 23 | 0.82 | 1394 |
| 35 | 30 | 20 | 0.71 | 1394 |
| 40 | 30 | 20 | 0.71 | 1365 |
| 45 | 30 | 20 | 0.71 | 1326 |
| 50 | 30 | 21 | 0.75 | 1345 |

In batch systems and in system where feed and fuel were fed together, the fuel to oxidizer ratio was 3.5. However, when the feed and fuel were pumped separately, it was possible to start with a fuel to oxidizer ratio as low as 1.24 and maintain steady state at a fuel to oxidizer ratio of 0.71.

A similar system can be used for separate additions of additives into the raw mix like iron or aluminum nitrates to get better properties. It may even be possible to eliminate one or more of these additives if they do not aid the process using this technique resulting in significant cost savings.

Example 14

Experiments on Continuous System to Check Self Sustainability of Combustion Synthesis Experiments were performed on the continuous system to study the self propagation reaction due to combustion synthesis. Raw materials charged into the continuous system were initially ignited using an external heat source to trigger the combustion reaction and thereafter the highly exothermic heat sustained the reaction further. At the start, ignition of the raw materials in the reactor is achieved using external heat sources (electrical coil heaters 1120 Watts, 10 units spanning 50 inches, length 5 inches each), to reach their ignition temperatures. Once the external heat source (electrical heater) initiates the reaction, the external heating sources were switched off, to allow the combustion to self propagate and maintain temperatures needed for the synthesis. The external heaters attached to the skin of the reactor preheat the reactor surface to temperatures of 700° C. internally. Initially the heaters covering ⅔ length of the reactor were switched on and were maintained at 500° C. Feed slurry with a flow rate of 30 ml/min and urea with a flow rate of 27.5 ml/min was introduced into the reactor and the speed of the screw conveyer was set at 36 rpm. After about 15 mins, the material was self ignited and started generating heat by itself. A gradual increase in the temperature was observed in the later part of the reactor where the heaters were switched off. Once the reactor reached thermodynamic equilibrium all the heaters were switched off.

Example 15

Compression Test Results

The raw mix was prepared by the exact same way mentioned in the previous samples. The raw mix was then pumped into a reactor preheated to 400° C. The material was then conveyed through the reactor using a screw conveyor. The reactor temperature was continuously varied for lower sintering and residence times to find out the effect of these on the particle size and strength. The following results were obtained.

TABLE 17

Optimization of Compressive Strength by
Varying the Reactor Temperature

| Reactor temperature (° C.) | Compressive strength 3 day (psi) | Compressive strength 7 day (psi) |
|---|---|---|
| 800 | 350 | 760 |
| 900 | 570 | 1080 |
| 1000 | 1030 | 1850 |
| 1050 | 1130 | 2530 |
| 1150 | 1100 | 2050 |

This data clearly depicts the relation between the reactor temperature and the compressive strength of the cement.

Example 16

Lab Scale Setup for NOx To Nitric Acid and Calcium Nitrate

The flue gasses from the reactor containing Nitric acid were passed through a wet absorber containing water. A pressure of 0-4 bar was also maintained in the absorber. Once the compressed gas along with air was passed through the absorber, it slowly reacted with water to form nitric acid in solution. The recovery rates and process efficiency was calculated by checking the pH of the solution. The experiments were conducted at different pressures to check for efficiency and yields at different pressures. The above experiments were also conducted with a 30% slurry solution of limestone. Once the compressed gas along with air was passed through the absorber, it slowly reacted with calcium carbonate and other magnesium salts in the limestone to form their respective nitrates. The solids were then separated by subjecting the nitrates to crystallization. The solids were then tested for loss on ignition at 750° C. and 1000° C. for carbonates and nitrates.

TABLE 18

Nitric Acid Production Based on Final Concentration
and Left Over Concentration of Acid

| Pressure (bar) | Temp (° C.) | Water in collection tank (ml) | $HNO_3$ in vessel (ml) | Final solution concentration (m/m) |
|---|---|---|---|---|
| 2-4 | 20 | 200 | 800 | 32% |
| 2-4 | 20 | 0 | 800 | 44% |
| 0 | 20 | 200 | 800 | 10% |

TABLE 19

Calcium Nitrate Formation Based on LOI Results

| Pressure (bar) | Temp (° C.) | $CaCO_3$/ water in collection tank (ml) | $HNO_3$ in vessel (ml) | Runtime (min) | LOI (750° C.) | LOI (1000° C.) |
|---|---|---|---|---|---|---|
| 4 | 20 | 50/600 | 800 | 60 | 27.5% | 0.4% |
| 4 | 20 | 50/600 | 800 | 60 | 27.4% | 0.3% |
| 4 | 20 | 50/600 | 800 | 30 | 13% | 14.3% |
| 0 | 20 | 50/600 | 800 | 30 | 1% | 27.4% |

Example 17

Commercial Plant Setup for NOx Recovery to Nitric Acid

The commercial plant setup was designed with upstream reactions of nitric acid mixing with limestone and downstream setup of nitric acid recovery. The flue gases from nitric acid mixing were designed to be passed along with the off gases from the reactor for better NOx recovery. The lab scale NOx recovery setup yielded 99.9% NOX recovery with 96% conversion to nitric acid and 4% was directly converted to calcium nitrate using a lime scrubber.

The plan for the commercial facility (producing 3000 tons/day cement) for NOx recovery and nitric acid production is as follows:

The NOx recovery system will process the NO and $NO_2$ gas and manufacture nitric ($HNO_3$) acid. It will be designed to produce 4,500 tons per day of 63 wt % $HNO_3$ acid with the design based on the following information:

1. Gas stream will contain 90 wt % NO or approximately 1,350 tons/day.
2. Gas stream will contain 10 wt % $NO_2$ or approximately 250 tons/day.
3. NO will be oxidized in an oxidation tower to $NO_2$.
4. The operation will produce 4,500 tons/day of $HNO_3$ acid.
5. The $HNO_3$ acid will have a concentration of 61 wt % to 65 wt % $HNO_3$.
6. The yield for the $HNO_3$ acid will be based on a 96% recovery of the NO and $NO_2$.

Example 18

Commercial Plant Setup for NOX to Calcium Nitrate

NOx (NO and $NO_2$) gases released from the raw material mixing tank and the reactor (from calcium nitrate and urea decomposition) can be recovered as $HNO_3$ and calcium nitrate by treating it with calcium oxide or calcium hydroxide. The lab scale NOx recovery setup yielded 99.9% overall NOx recovery with 96% conversion accounting for nitric acid and remaining 4% was directly converted to calcium nitrate.

A gas stream of $NO_2$ and NO when passed through a packed bed reactor filled with sand and calcium hydroxide resulted in 80% calcium nitrate and 20% calcium nitrite which in turn was oxidized to give calcium nitrate.

NOx can also be recovered as Ca nitrate or nitrites by scrubbing the gases in a limestone solution.

Example 19

Particle Size Variations

Sintering is an important mechanism by which the nanoparticles agglomerate to form harder clinkers, thereby increasing the particle size and decreasing the surface area. Sintering was accomplished by increasing the residence times in the reactor. Increases in particle size generally produce cement with increased setting times because of the decrease in surface are and reactivity. Thus nano-particle flakes, when crushed, generally have lower setting times. Using this "dial in" technology a wide range of setting times can be achieved.

The raw mix was fed into the continuous system under different residence times by introducing inline cooling to quench the particles at different reaction temperatures. The urea amounts were also varied proportionately to affect the residence times. The product collected was then analyzed for setting times using the Vicat's apparatus and particle size using SEM images.

Example 20

$CO_2$ Sequestration of Exhaust Gases

There are two (2) major sources of $CO_2$ in the system. The carbon dioxide emissions are mainly from limestone and from fuel combustion (e.g., urea, lignin, natural gas or any other fuel). These emissions are part of the flue gas composition. The flue gasses mainly consist of CO, $CO_2$, NOx, air and water.

CO in the flue gases can be reduced by increasing the combustion efficiency as cited in previous examples. Once combustion efficiency has been optimized, the flue gasses can then be oxidized to convert the remaining NOx to $NO_2$ as part of the NOx recovery process.

The flue gasses are then passed through an absorption column to scrub the nitric acid under pressure. The $CO_2$ passes through the absorption column with short residence times. The $CO_2$ that is separated and then passed through ocean water or salt water containing calcium and/or magnesium salts (e.g., brackish water). As the $CO_2$ concentration in the solution increases, the salts start forming carbonates (like calcium carbonate and magnesium carbonate) which can be reused in the system (e.g., after concentration from solution). The trace amounts of remaining NO can be directed into the oxidation chamber for oxidation, thereby reducing the emissions to almost zero.

Example 21

Heat Recovery

The flue gasses from the reactor emerge at very high temperatures on the order of 1000° C. The gas volumes are very high and most of the heat can be recycled into the system for higher efficiency.

The reactor was re-designed to lose as little heat as possible to the heat sinks The screw and the reactor were maintained at the same temperature to reduce the heat difference between the gasses and the system. Once this was done, the gasses came out at higher temperatures of the order of 1400° C. The flue gasses were passed through a heat exchanger before they entered the NOx recovery system. The heat exchanger used a twin air flow mechanism wherein the flue gasses were used to heat the air stream and then the feed and then fuel tank and then finally passed through the reactor. Counter current fresh air was passed from one side and the flue gasses from the other side. In this manner, the heat was efficiently transferred. This pre-heated air was then passed through the reactor or used for preheating the feed to increase heating efficiency thereby reducing the fuel amounts.

Example 22

Determination of LOI and Free Lime Content in Batch

Experiments were performed in order to determine the loss on ignition at 1000° C. and free lime on batch samples at different conditions. Results are given in the table below.

TABLE 20

| Sample | F/C ratio | Furnace Temperature (° C.) | Combustion Temperature (° C.) | LOI % | Free Lime % |
|---|---|---|---|---|---|
| 18 | 3.50 | 600 | 1350 | 0.85 | 4.19 |
| 19 | 2.68 | 600 | 1021 | 5.92 | 21.63 |
| 20 | 1.75 | 600 | 978 | 48 | 2 |

Example 20

Example with Lignin as Fuel for Combustion Synthesis

The urea which was earlier used as fuel was replaced with lignin. Lignin has a complex structure and has a high calorific value of 25.5 MJ/Kg. On burning, lignin leaves about 3.40% of fly ash which contains approximately 16.59% $SiO_2$, 3.25% $Al_2O_3$, 1.68% $Fe_2O_3$ and 16.90% CaO. While not wishing to be bound by theory, the presence of cement forming oxides in the ash could reduce the amount of raw materials used in the process. The fly ash could help in increasing the compressive strength of cement. The experiments with lignin proved to increase the compressive strength values even greater than that of urea. Lignin was identified as a green fuel because of fewer green house gas emissions.

Batch experiments similar to that of urea were done with lignin as fuel. Raw mix containing 294 g of calcium nitrate, 25.63 g aluminum nitrate, 6.65 g iron nitrate and 25.39 g fume silica along with 50 g of lignin was well mixed in a mixer grinder and made into thick slurry and then transferred to an iron beaker. The beaker was introduced into an oven preheated to 500° C. with a continuous air supply of less than 20 psi. After 6-12 minutes at oven temperatures ranging from 160-280° C., the material ignited and the temperature increased to more or less than 900° C. Several experiments with different amounts of lignin were performed and the samples were collected and checked for free lime. The results are tabulated below.

TABLE 21

| Batch # | Lignin (g) | Oven Temp (° C.) | Max Temp (° C.) | Free Lime (%) |
|---|---|---|---|---|
| 1 | 50 | 500 | 900 | 0.5 |
| 2 | 40 | 500 | 900 | 1.13 |
| 3 | 35 | 500 | 800 | 1.51 |
| 4 | 30 | 500 | 800 | 1.40 |
| 5 | 25 | 500 | 700 | 2.07 |
| 6 | 20 | 500 | 700 | 2.92 |

Some experiments were done on a small continuous system designed to process 10 kg of raw material per day. The continuous system included a mixing tank with a stirrer, a heating belt to preheat the feed, a progressive cavity pump to transport the feed to the reactor and a screw conveyer in the reactor to push the cement particles into the collecting chamber. Raw mix in the same amount as the batch experiments described above with 50 gm of lignin was tested on this system. The mixer and the pipeline were maintained at a temperature of about 40-60° C. to successfully pump the raw feed into the reactor. The samples were collected and the free lime values are in agreement with the batch results. Samples from both batch and continuous runs were sent for XRF analysis and the results are tabulated below.

TABLE 22

XRF Data for Samples from Both Batch and Continuous Runs

| XRF | Batch | Continuous |
|---|---|---|
| Silicon Dioxide | 20.13 | 20.46 |
| Aluminum Oxide | 2.87 | 3.02 |
| Iron Oxide | 1.11 | 1.22 |
| Calcium Oxide | 59.48 | 57.83 |
| Magnesium Oxide | 0.11 | 0.19 |
| Sodium Oxide | 0.00 | 0.02 |
| Potassium Oxide | 0.03 | 0.05 |
| Total Alkalis as $Na_2O$ | 0.02 | 0.05 |
| Titanium Dioxide | 0.00 | 0.00 |
| Manganese Dioxide ($MnO_2$) | 0.01 | 0.01 |
| Phosphorus Pentoxide | 0.00 | 0.00 |
| Strontium Oxide | 0.02 | 0.03 |
| Barium Oxide | 0.01 | 0.01 |
| Sulfur Trioxide | 2.09 | 1.92 |
| Bogue $C_3S$ | 62.33 | 52.42 |
| Bogue $C_2S$ | 10.72 | 19.13 |
| Bogue $C_3A$ | 5.73 | 5.94 |
| Bogue $C_4AF$ | 3.37 | 3.71 |

Example 24

Flame Spray Reactor for Instantaneous Cement

The flame spray reactor used included a nozzle with four channels: one liquid channel for the raw material; one channel for air or $O_2$ to atomize the raw materials; and two channels for $CH_4$ and $O_2$ to supply the supporting flame. The raw material was pumped into the central channel and atomized by either air or oxygen. When the atomized raw material was transported through the flame, the fuel ignited almost immediately. The cement particles produced by combustion can be collected using a hood and a filter. The fuel to oxidizer ratio can be easily tuned by changing the composition of the raw materials and the flow rate of raw material and the gas used to atomize the raw material.

Example 25

50 g/Batch White Cement Production 90 ml of Nitric acid was primarily mixed with 62.33 g calcium carbonate in a 100 ml beaker. The slow addition of nitric acid to the calcium carbonate resulted in the formation of calcium nitrate and water. To this mixture 87 g of urea, 12.82 g of aluminum nitrate, and 12.7 g of silica fume were added at their appropriate amounts based on the final percentage of individual components required for cement formation. All the raw materials were bought from Fischer Scientific.

Then the beaker was kept on a hot plate with continuous stirring the temperature of the hot plate was maintained at 70° C. until the solution becomes gel. This step of evaporation of water is important in cement production. The nitric acid ions can decompose into $NO_2$ and $O_2$ at temperatures above 72° C.

The gel is then placed in the preheated furnace maintained at a temperature of 650° C. Two thermocouples were placed at different zones in the beaker. The thermocouples were constantly monitored. Calcium nitrate and aluminum nitrate in the presence of urea were heated up to the ignition temp of urea to give a self sustaining and rather fast combustion reaction resulting in dry, crystalline flakes of white cement. The large amount of gases results in appearance of flames which can reach temperature of 1450° C. for cement formation. The flakes of cement material obtained were cooled to room temperature and ground with 2% Gypsum then sent for testing. The furnace was switched off as soon as the temperature read the ignition temperature of urea.

Different experiments were conducted varying the furnace temperature from 400-650° C. to obtain the standard ignition temperature at the fastest rate. The above procedure was followed to prepare the raw feed and experiments were conducted to obtain the optimized condition.

Example 26

Continuous System for White Cement Production

Nitric acid was added to calcium carbonate in a very slow manner in increments of 5 ml to obtain calcium nitrate and water. The mixture was then thoroughly mixed for 30 minutes for the complete conversion of calcium carbonate to calcium nitrate.

Aluminum nitrate, urea and silica fume were then added in appropriate amounts based on the final composition of cement. The mixture was then again mixed for 30 minutes with a lab stirrer. All raw materials were bought from Fischer Scientific.

Heating tapes were carefully wrapped around the stainless steel mixing vessel and the temperature of the mixture was maintained at 70° C., using a thermocouple and a temperature controller, with continuous mixing.

The mixture was then transferred to the feed hopper as shown in FIG. 3. The pump was then started to adjust the flow rate of the raw mix. The pressure of the system was constantly monitored for blocks. Then temperature of the reactor shown in FIG. 3 was maintained at about 500° C.

The flow of the raw mix into the reactor was constantly metered and controlled using a flow controller. This experiment was continuously repeated to match the results of the previously described batch system.

The continuous system with screw conveyor of larger diameter was tested with different flow rates. The screw conveyor was connected to a motor and a gear system, the gear has speed ratio of 20:1 while a vector control device is used to control the speed of the motor which was set according to the experimental needs.

Since the flow rate to get continuous production of cement should be small, the flow through the pump was controlled by variable frequency drive and pump's knob. A variable-frequency drive (VFD) is a system for controlling the rotational speed of an alternating current electric motor by controlling the frequency of the electrical power supplied to the motor. The pump used for the slurry was a progressive cavity pump. This type of pump transfers fluid by means of the progress through the pump of a sequence of small fixed shape, discrete cavities as its rotor was turned.

The feed was introduced through a hopper which passes through the pump at desired flow rate. The line from the pump to the reactor had pressure gauges to monitor any pressure build up during the experimental run and a relief valve. The feed in the hopper was constantly stirred with an agitator at set speed.

The reactor was heated with coiled heating elements of 275 W of size 1" in diameter and 1" in length. The heating elements are switched on well in advance before the pump is started. Reactor length of 22" and 1" diameter was used for the continuous system.

The screw conveyor and the reactor are cleaned before each run. The white cement was collected in a beaker. The maximum production rate is 1 kg/D.

While the foregoing specification teaches the principles of the present invention, with examples provided for the purpose of illustration, it will be appreciated by one skilled in the art from reading this disclosure that various changes in form and detail can be made without departing from the true scope of the invention.

What is claimed is:

1. A method of making a cement clinker comprising:
introducing a raw material mixture and a fuel into an inlet of a reactor chamber, wherein the raw material mixture comprises: calcium nitrate; an aluminum source; a silica source; and optionally, an iron source;
transporting the raw material mixture through the reactor chamber from the inlet towards an outlet of the reactor chamber while heating the raw materials in the reactor chamber to the self ignition temperature of the fuel and allowing combustion of the fuel to heat up the raw material mixture to a temperature of 900-1500° C. thereby allowing the raw material mixture to react to form cementitious particles which are ejected from the outlet of the reactor chamber; and
cooling the cementitious particles emerging from the outlet of the reactor chamber.

2. The method of claim 1, wherein the ratio of the amount of energy generated by combustion of the fuel to the weight of the calcium nitrate, the aluminum source, the iron source and the silica source in the raw material mixture is 1.6 to 2.5 MMBTU/ton.

3. The method of claim 1, wherein the ratio of the amount of energy generated by combustion of the fuel to the weight of the calcium nitrate, the aluminum source, the iron source and the silica source in the raw material mixture is 1.7-1.9 MMBTU/ton.

4. The method of claim 1, wherein the raw material mixture is introduced into the inlet of the reactor chamber at a temperature of 35 to 100° C.

5. The method of claim 1, wherein the raw material mixture is introduced into the inlet of the reactor chamber at a temperature of 60 to 90° C.

6. The method of claim 1, wherein the raw material mixture is introduced into the inlet of the reactor chamber by a pump.

7. The method of claim 1, further comprising separating the cementitious particles from gases emerging from the outlet of the reactor chamber before cooling the cementitious particles.

8. The method of claim 1, wherein the reactor chamber is a tubular reactor chamber, and wherein transporting the raw materials through the reactor chamber comprises rotating a screw conveyor in the reactor chamber such that the screw conveyor transports the raw material from the inlet of the reactor chamber towards the outlet of the reactor chamber.

9. The method of claim 1, further comprising introducing air into the reactor chamber at one or more locations along the length of the reactor chamber.

10. The method of claim 1, further comprising introducing one or more of the fuel, the calcium nitrate, the aluminum source, the iron source and the silica source separately into an inlet of an in-line mixer, wherein the raw material mixture emerges from an outlet of the in-line mixer and is subsequently introduced into the inlet of the reactor chamber.

11. The method of claim 10, wherein the fuel is introduced separately into the inlet of the in-line mixer.

12. The method of claim 11, wherein the fuel is introduced as a fluid into the inlet of the in-line mixer.

13. The method of claim 11, wherein the fuel is introduced as a liquid or a gas into the inlet of the in-line mixer.

14. The method of claim 11, wherein the calcium nitrate, the aluminum source, the iron source and the silica source are introduced separately into an inlet of the in-line mixer at a temperature of from 60 to 90° C.

15. The method of claim 12, wherein the fuel is urea and wherein the urea is introduced into the inlet of the in-line mixer at a temperature of at least 132° C.

16. The method of claim 11, further comprising:
monitoring the temperature inside the reactor; and
controlling the temperature inside the reactor by varying the amount of fuel introduced into the inlet of the in-line mixer.

17. The method of claim 16, wherein controlling the temperature comprises increasing the amount of fuel introduced into the inlet of the in-line mixer if the temperature falls below a first temperature value and decreasing the amount of fuel introduced into the inlet of the in-line mixer if the temperature rises above a second temperature greater than the first-temperature.

18. The method of claim 17, wherein the first temperature is less than 1175° C. and wherein the second temperature is greater than 1175° C.

19. The method of claim 17, wherein the raw material mixture does not comprise an iron source and wherein the first temperature is less than 1400° C. and wherein the second temperature is greater than 1400° C.

20. The method of claim 7, wherein separating the cementitious particles comprises introducing material emerging from the outlet of the reactor into an entry zone of a collection system comprising a first outlet through which gases emerge and a second outlet through which the cementitious particles emerge.

21. The method of claim 20, further comprising:
drawing the gases through the first outlet of the entry zone using an exhaust fan; and/or
condensing water vapor from the gases emerging from the first outlet of the entry zone.

22. The method of claim 20, further comprising contacting the cementitious particles emerging from the second outlet of the entry zone with a cooling fluid thereby cooling the cementitious particles.

23. The method of claim 20, wherein the cementitious particles emerging from the second outlet of the entry zone are introduced into an inlet of a cooling zone comprising a cooling surface having a plurality of holes therethrough, wherein the cooling surface is configured such that the cementitious particles contacting the cooling plate slide along the cooling plate under the force of gravity and wherein a cooling fluid is passed through the holes in the plate to contact and thereby cool the cementitious particles and wherein the cementitious particles emerge from an outlet of the cooling zone.

24. The method of claim 22, wherein the cooling fluid is air or supercritical $CO_2$.

25. The method of claim 23, wherein the cooled cementitious particles emerging from the outlet of the cooling zone are collected in a collection vessel.

26. The method of claim 1, further comprising reacting nitric acid and calcium carbonate in a reaction vessel to form the calcium nitrate before introducing the fuel and the raw material mixture into the reactor chamber.

27. The method of claim 26, further comprising:
separating the cementitious particles from gases emerging from the outlet of the reactor chamber;
wherein gases are produced from the reaction of nitric acid and calcium carbonate in the reaction vessel, wherein the gases produced in the reaction vessel are collected and combined with gases emerging from the outlet of the reactor chamber.

28. The method of claim 27, wherein the combined gases comprise NO and $NO_2$, the method further comprising:
    converting the NO to $NO_2$; and/or
    converting the NO and $NO_2$ to calcium nitrate and/or $HNO_3$.

29. The method of claim 9, further comprising:
    monitoring the temperature inside the reactor; and
    controlling the temperature inside the reactor by varying the amount of air introduced into the reactor chamber.

30. The method of claim 9, further comprising:
    monitoring the amount of $O_2$, CO, NO and/or $NO_2$ in gases emerging from the outlet of the reactor; and
    varying the amount of air introduced into the reactor chamber to increase the amount of NO and/or $NO_2$ and/or to decrease the amount of CO in the gases emerging from the outlet of the reactor.

31. The method of claim 1, further comprising:
    a) determining the setting time of the cementitious particles;
    b) changing one or more processing variable selected from the group consisting of the speed at which the raw materials are transported through the reactor chamber, the temperature of the reactor chamber, the rate at which the cementitious particles are cooled and combinations thereof;
    c) determining the setting time of the cementitious particles produced under the varied processing conditions;
    d) repeating b) and c) one or more times to determine the relationship between the processing conditions and the setting time of the cementitious particles.

32. The method of claim 7, further comprising:
    passing the gases emerging from the outlet of the reactor chamber through an absorption column to remove nitric acid; and
    passing the gases emerging from the absorption column through salt water comprising calcium and/or magnesium salts.

33. The method of claim 7, further comprising:
    passing the gases emerging from the outlet of the reactor chamber through a heat exchanger; and
    passing a fluid over the heat exchanger to heat the fluid; and
    using the heated fluid to heat one or more of the calcium nitrate, aluminum source, iron source, silica source or fuel.

34. The method of claim 1, wherein the raw material mixture comprises water, the method further comprising evaporating water from the raw material mixture at a temperature of 20° C. to 100° C. prior to introducing the raw material mixture into the inlet of the reactor chamber.

35. The method of claim 34, further comprising:
    reacting calcium carbonate with nitric acid to form the calcium nitrate;
    combining the calcium nitrate with water, the aluminum source, the silica source and the iron source, if present, to form the raw material mixture before evaporating water from the raw material mixture.

36. The method of claim 34, wherein water is evaporated from the raw material mixture at a temperature of less than 72° C. and/or at a pressure less than atmospheric pressure.

37. The method of claim 1, wherein the fuel is selected from the group consisting of urea, coal, natural gas, hydrazine, biomass, glycine, lignin and combinations thereof.

38. A method comprising:
    evaporating water from a raw material mixture at a temperature of 20° C. to 100° C., wherein the raw material mixture comprises: calcium nitrate; an aluminum source; a silica source; and optionally, an iron source.

39. The method of claim 38, wherein the raw material mixture comprises a fuel prior to evaporating or wherein the method further comprises adding a fuel to the raw material mixture after evaporating.

40. The method of claim 38, further comprising:
    reacting calcium carbonate with nitric acid to form the calcium nitrate;
    combining the calcium nitrate with water, the aluminum source, the silica source and the iron source, if present, to form the raw material mixture before evaporating water from the raw material mixture.

41. The method of claim 38, wherein:
    the aluminum source comprises aluminum oxide, aluminum nitrate, aluminum acetate or clay;
    the iron source comprises iron nitrate or iron oxide; and
    the silica source comprises fumed silica, colloidal silica or clay.

42. The method of claim 39, wherein the fuel is selected from the group consisting of urea, coal, natural gas, hydrazine, biomass, glycine, lignin and combinations thereof.

43. The method of claim 38, wherein the raw material mixture does not comprise an iron source.

44. The method of claim 38, wherein water is evaporated from the raw material mixture at a temperature of less than 72° C. and/or at a pressure less than atmospheric pressure.

45. A method of making a cement clinker comprising:
    atomizing a raw material mixture and a fuel to form atomized particles, wherein the raw material mixture comprises: calcium nitrate; an aluminum source; a silica source;
    and optionally, an iron source;
    transporting the atomized particles through a flame such that the fuel in the atomized particles combusts;
    allowing combustion of the fuel to heat up the raw material mixture in the atomized particles to a temperature of 900-1500° C. thereby allowing the raw material mixture to react to form cementitious particles; and
    cooling the cementitious particles.

46. The method of claim 45, wherein the ratio of the amount of energy generated by combustion of the fuel to the weight of the calcium nitrate, the aluminum source, the iron source and the silica source in the raw material mixture is 1.6 to 2.5 MMBTU/ton or 1.7-1.9 MMBTU/ton.

47. A method of making a cement clinker comprising:
    heating a raw material mixture to a temperature of 60° C. to 135° C. such that the mixture becomes a liquid, wherein the raw material mixture comprises: calcium nitrate;
    an aluminum source; a silica source; and optionally, an iron source.

48. The method of claim 47, wherein:
    the aluminum source comprises aluminum oxide, aluminum nitrate, aluminum acetate or clay;
    the iron source comprises iron nitrate or iron oxide; and
    the silica source comprises fumed silica, colloidal silica or clay.

49. The method of claim 47, further comprising pumping the liquid.

50. The method of claim 47, wherein the raw material mixture further comprises a fuel.

51. The method of claim 50, further comprising pumping the liquid.

52. The method of claim 47, wherein the liquid raw material mixture comprises a fuel, the method further comprising pumping the liquid raw material mixture and the fuel into the inlet of a reactor chamber;
- transporting the raw material mixture through the reactor chamber from the inlet towards an outlet of the reactor chamber while heating the raw materials in the reactor chamber to the self ignition temperature of the fuel and allowing combustion of the fuel to heat up the raw material mixture to a temperature of 900-1500° C. thereby allowing the raw material mixture to react to form cementitious particles which are ejected from the outlet of the reactor chamber; and
- cooling the cementitious particles emerging from the outlet of the reactor chamber.

53. The method of claim 52, wherein the reactor chamber is a tubular reactor chamber, and wherein transporting the raw materials through the reactor chamber comprises rotating a screw conveyor in the reactor chamber such that the screw conveyor transports the raw material from the inlet of the reactor chamber towards the outlet of the reactor chamber.

54. The method of claim 52, wherein a twin screw conveyor is used to transport the raw material from the inlet of the reactor chamber towards the outlet of the reactor chamber.

55. The method of claim 52, wherein the reactor chamber is a kiln.

56. The method of claim 52, further comprising introducing the fuel and the raw material mixture separately into an inlet of an in-line mixer, wherein the liquid raw material mixture and fuel emerges from an outlet of the in-line mixer and is subsequently introduced into the inlet of the reactor chamber.

57. The method of claim 56, wherein the fuel is introduced as a fluid into the inlet of the in-line mixer.

58. The method of claim 52, further comprising reacting nitric acid and calcium carbonate to form the calcium nitrate before heating the raw material mixture.

59. The method of claim 58, further comprising:
- separating the cementitious particles from gases emerging from the outlet of the reactor chamber;
- wherein gases are produced from the reaction of nitric acid and calcium carbonate in the reaction vessel, wherein the gases produced in the reaction vessel are collected and combined with gases emerging from the outlet of the reactor chamber.

60. The method of claim 59, wherein the combined gases comprise NO and $NO_2$, the method further comprising:
- converting the NO to $NO_2$; and/or
- converting the NO and $NO_2$ to calcium nitrate, calcium nitrite and/or $HNO_3$.

61. The method of claim 60, wherein the NO and $NO_2$ gases are converted to calcium nitrate by reaction with calcium hydroxide.

62. The method of claim 60, wherein the NO and $NO_2$ gases are converted to $HNO_3$ by reaction with water.

63. The method of claim 62, wherein the $HNO_3$ is reacted with calcium carbonate to form calcium nitrate.

64. The method of claim 47, wherein the raw material mixture comprises an iron source.

65. The method of claim 64, wherein the iron source is iron nitrate.

66. The method of claim 47, wherein the aluminum source is aluminum nitrate and wherein the iron source is iron nitrate.

67. The method of claim 47, further comprising:
- adding a fuel to the liquid raw material mixture either before or after heating;
- heating the fuel and raw material mixture to the self ignition temperature of the fuel;
- allowing combustion of the fuel to heat up the raw material mixture to a temperature of 900-1500° C. thereby allowing the raw material mixture to react to form cementitious particles; and
- cooling the cementitious particles.

68. The method of claim 47, further comprising:
- heating the raw material mixture to convert the raw material mixture to a cementitious composition.

69. The method of claim 50, further comprising:
- atomizing the liquid raw material mixture and fuel to form atomized particles;
- transporting the atomized particles through a flame such that the fuel in the atomized particles combusts;
- allowing combustion of the fuel to heat up the raw material mixture in the atomized particles to a temperature of 900-1500° C. thereby allowing the raw material mixture to react to form cementitious particles; and
- cooling the cementitious particles.

70. The method of claim 47, further comprising:
- atomizing the liquid raw material mixture to form atomized particles;
- transporting the atomized particles through a flame such that the raw material mixture reacts to form cementitious particles; and
- cooling the cementitious particles.

71. The method of claim 47, further comprising:
- reacting calcium carbonate with nitric acid to form the calcium nitrate; and combining the calcium nitrate with the aluminum source, the silica source and the iron source, if present, to form the raw material mixture.

72. The method of claim 50, wherein the fuel is selected from the group consisting of urea, coal, natural gas, hydrazine, biomass, glycine, lignin and combinations thereof.

* * * * *